Figure 2:
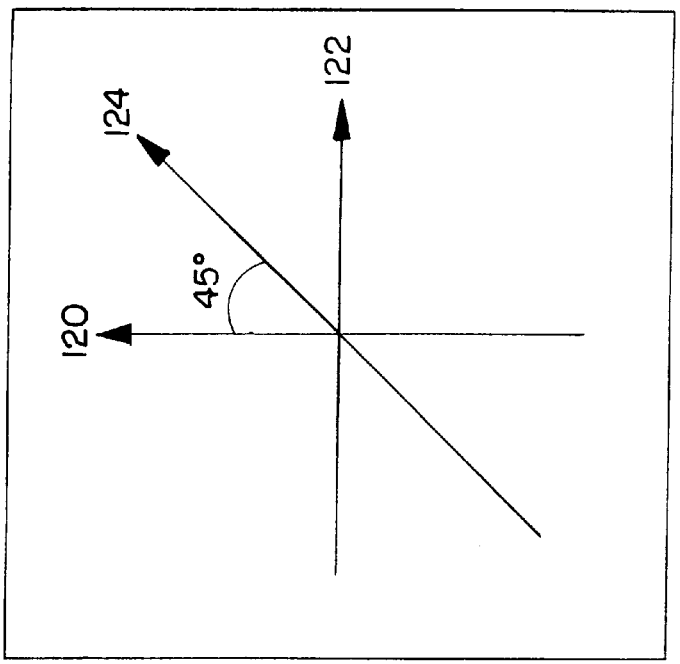

United States Patent [19]
Tillin et al.

[11] Patent Number: 6,144,433
[45] Date of Patent: Nov. 7, 2000

[54] LCD IN WHICH TWO REGIONS OF LIQUID CRYSTAL LAYER ACT AS TWO OPTICAL RETARDERS HAVING INCLINED OPTIC AXES

[75] Inventors: Martin David Tillin, Abington; Michael John Towler, Botley, both of United Kingdom

[73] Assignee: Sharp Kabushiki Kaisha, Osaka, Japan

[21] Appl. No.: 08/881,138

[22] Filed: Jun. 24, 1997

[30] Foreign Application Priority Data

Jun. 26, 1996 [GB] United Kingdom .................. 9613354

[51] Int. Cl.$^7$ .......................... G02F 1/1337; G02F 1/141
[52] U.S. Cl. .......................... 349/123; 349/128; 349/136
[58] Field of Search .................................. 349/123, 128, 349/136

[56] References Cited

U.S. PATENT DOCUMENTS

| | | | |
|---|---|---|---|
| 4,097,128 | 6/1978 | Matsumoto et al. | 349/78 |
| 4,231,639 | 11/1980 | Banda | 350/335 |
| 4,241,339 | 12/1980 | Ushiyama | 340/702 |
| 4,378,955 | 4/1983 | Bleha, Jr. et al. | 350/334 |
| 4,385,806 | 5/1983 | Fergason | 350/347 |
| 4,566,758 | 1/1986 | Bos | 349/136 |

(List continued on next page.)

FOREIGN PATENT DOCUMENTS

| | | | |
|---|---|---|---|
| 0377757 | 7/1990 | European Pat. Off. | G02F 1/133 |
| 0434000 | 6/1991 | European Pat. Off. . | |
| 0481700 | 10/1991 | European Pat. Off. . | |
| 0467456 | 1/1992 | European Pat. Off. . | |
| 0600541 | 6/1994 | European Pat. Off. . | |
| 0793133 | 9/1997 | European Pat. Off. | G02F 1/1335 |
| 06242471 | 9/1994 | Japan . | |
| 2276730 | 10/1994 | United Kingdom . | |
| 2286056 | 8/1995 | United Kingdom . | |
| 9009614 | 8/1990 | WIPO . | |

OTHER PUBLICATIONS

"Method to Suppress Reverse Twist State for Ultraviolet Two–Domain Liquid Crystal Display and Other Splay Type Two–Domain Liquid Crystal Displays", IBM Technical Disclosure Bulletin, vol. 40, No. 5, May 1997, pp. 77–78.

European Search Report for European Patent Application Ser. No. 97304483.7 dated Nov. 17, 1998.

Search Report for Application No. 97304496.9; Dated Apr. 16, 1998.

S. Palmer; Applied Optics, May 1, 1996, vol. 35, No. 3, "Optical Angular Properties of Twisted–Nematic Liquid–Crystal Cells with Twist Angles of Less Than 90°".

U.S. Patent Application Ser. No. 08/880,456; Filed Jun. 24, 1997.

European Search Report related to European Patent Application No. 97304496.9 dated Aug. 18, 1998.

Itoh Y. et al.; "A Double–Layer Electrically Controlled Birefringence Liquid–Crystal Display with a Wide–Viewing-Angle Cone" Japanese Journal of Applied Physics, Part 2 (Letters), Jul. 15, 1991, Japan, vol. 30, No. 7B, pp. L1296–L1299.

(List continued on next page.)

Primary Examiner—Walter Malinowski
Attorney, Agent, or Firm—Renner, Otto, Boisselle & Sklar, LLP

[57] ABSTRACT

A twisted liquid crystal device includes a liquid crystal layer and first and second alignment layers disposed in opposite sides of the liquid crystal layer. The first and second alignment layers have respective alignment directions which are mutually inclined. A first linear polarizer is disposed on the opposite side of the first alignment layer to the liquid crystal layer. Electrodes apply a variable voltage across the liquid crystal layer which has a twisted liquid crystal structure. The liquid crystal layer is arranged for operation in surface switching mode with first and second regions of the liquid crystal layer adjacent the alignment layers being mutually optically de-coupled so as to define, within the liquid crystal layer when in use, a pair of separate, active optical retarders having mutually inclined optic axes.

38 Claims, 18 Drawing Sheets

U.S. PATENT DOCUMENTS

| | | | |
|---|---|---|---|
| 4,688,900 | 8/1987 | Doanne | 350/347 |
| 4,767,190 | 8/1988 | Dir et al. | 350/339 |
| 4,842,379 | 6/1989 | Oishi et al. | 350/347 |
| 4,952,029 | 8/1990 | Hayashi et al. | 349/76 |
| 5,090,794 | 2/1992 | Hatano et al. | 359/53 |
| 5,124,824 | 6/1992 | Kozaki et al. | 359/73 |
| 5,126,868 | 6/1992 | Kizaki et al. | 359/86 |
| 5,145,546 | 9/1992 | Yuasa et al. | 356/324 |
| 5,221,978 | 6/1993 | Heynderickx et al. | 349/76 |
| 5,231,521 | 7/1993 | Johnson et al. | 359/93 |
| 5,243,455 | 9/1993 | Johnson et al. | 359/93 |
| 5,303,075 | 4/1994 | Wada et al. | 349/180 |
| 5,343,313 | 8/1994 | Fergason | 359/83 |
| 5,414,541 | 5/1995 | Patel et al. | 359/39 |
| 5,440,413 | 8/1995 | Kikuchi et al. | 359/73 |
| 5,496,498 | 3/1996 | Toyooka et al. | 252/299.01 |
| 5,570,211 | 10/1996 | Hanaoka et al. | 359/53 |
| 5,680,184 | 10/1997 | Nishino | 349/78 |
| 5,745,206 | 4/1998 | Koike et al. | 349/129 |
| 5,764,325 | 6/1998 | Bryan-Brown et al. | 349/123 |
| 5,781,262 | 7/1998 | Suzuki et al. | 349/128 |
| 5,796,459 | 8/1998 | Bryan-Brown et al. | 349/132 |
| 5,808,716 | 9/1998 | Gass et al. | 349/124 |

OTHER PUBLICATIONS

Saito, S.: "Viewing Angle Characteristics of ECB Type Multi–Colored LCD with Non–Twist", Molecular Crystals and Liquid Crystals, 1986, UK, vol. 138, No. 1–4, pp. 187–210.

Takahashi T. et al.: "Improvement of Multiplexiability of Double–Layered Homogeneously Oriented Nematic LCD by Simultaneously Driving Method" Electronics and Communications in Japan, Part 2 (Electronics), Dec. 1991, USA, vol. 74, No. 12, pp. 49–58.

Kuo C—L et al.: "Wide–Viewing–Angle Reflective LCD Using A Film–Compensated HAN Cell with Single Polarizer" Proceedings of Fifteenth International Display Research Conference, Asia Display '95, Proceedings of $15^{th}$ International Display Research Conference, Hamamatsu, Japan, Oct. 16–18, 1995, pp. 135–138.

Search Report for Application No. GB 9613364.0; Dated Sep. 26, 1996.

S. Pancharatnam, Proc. Ind. Acad Sci., vol. 41a, pp. 130–136, 1955, "Achromatic Combinations of Birefringent Plates, Part I".

S. Pancharatnam, Proc. Ind. Acad Sci., vol. 41a, pp. 137–144, 1955, "Achromatic combinations of Birefringent Plates, Part II".

P. D. Berezin et al., Sov. J. Quant. Electron., vol. 3, No. 1, pp. 78–79, 1973, "Electroopic Switching in Oriented Liquid–Crystal Films".

P.J. Bos et al., Mol. Cryst. Liq. Cryst., vol. 113, pp. 329–339, 1984, "The pi–Cell: A Fast Liquid–Crystal Optical–Switching Device".

A. Sato, Display Devices, pp. 18–21, 1994, Reflection Formats for Color LCDs Solve Power–Consumption Problems.

G.D. Sharp et al., SID 93 Digest, pp. 665–668, 1993, "P–60: Color Switching Using Ferroelectric Liquid Crystals".

U.S. Application Ser. No. 08/880,456, filed Jun. 23, 1997 in the name of Tillin et al.

LCD IN WHICH TWO REGIONS OF LIQUID CRYSTAL LAYER ACT AS TWO OPTICAL RETARDERS HAVING INCLINED OPTIC AXES

This invention relates to liquid crystal devices and is more particularly concerned with fast switching achromatic twisted liquid crystal devices for use in liquid crystal displays, such as for example televisions, computer screens, 3-D displays, virtual reality displays and also optical systems requiring fast polarisation switches, spatial light modulators or optical shutters (e.g. for optical communications).

Achromatic combinations of birefringent plates used to produce an achromatic circular polariser are disclosed in Proc. Ind. Acad Sci., 1955, 41a, page 130, whilst Proc. Ind. Acad. Sci., 1955, 41a, page 137 discloses achromatic combinations of birefringent plates which form an achromatic quarter wave plate. These achromatic retarders are made from combinations of fixed optical retarders with different azimuthal orientations of their optic axes. A method for calculating the required retardations and angles is also given. The first mentioned paper details the use of two half wave plates and a quarter wave plate to make a passive achromatic circular polariser. These are known as Pancharatnam or combination retarders.

Sov. J. Quant. Electron., 1973, 3, pages 78 and 79 discloses electro-optic switching in oriented liquid crystal films in which parallel (or anti-parallel) aligned liquid crystals are switched at high electric fields. Fast response times are obtained due to the quick relaxation of surface regions which are re-oriented by the high electric fields. Thus, this is a disclosure relating to so-called "surface switching mode" liquid crystals. U.S. Pat. No. 4,385,806 discloses a liquid crystal display with improved angle of view and response times. Improved response times are obtained from an anti-parallel aligned display which is driven at high voltages to cause a re-orientation of surface regions of the liquid crystal layer, i.e. regions of the liquid crystal layer near to the alignment surfaces of the cell. The alignment surfaces in the displays of U.S. Pat. No. 4,385,806 induce azimuthal alignment of the liquid crystals in the same direction in these surface regions. The cell is disposed between two linear polarisers having mutually perpendicular (crossed) polarisation axes, and two fixed optical retardation plates with mutually perpendicular slow axes are also provided. The slow axis of each fixed optical retardation plates is parallel with the polarisation axis of a respective one of the linear polarisers. However, such a device suffers from the disadvantage that the dark state of the cell is undesirably highly chromatic (blue) when used between parallel polarisers or in reflective mode. Accordingly, it is not particularly suited to such applications.

So-called pi-cells are disclosed in Mol. Cryst. Liq. Cryst., 1984, 113, pages 329 to 339, for use in a fast liquid crystal optical switching device. The pi-cell is formed from a liquid crystal aligned by parallel rubbed surfaces and operates above a certain threshold voltage, above which it is energetically favourable for the directors of the liquid crystal to take up a configuration called the V state. The director configuration in the centre of the cell bears some resemblance to that of other liquid crystal cells at high voltages in that, as the field is increased, re-orientation of the liquid crystal directors (switching) occurs in the regions near the surfaces of the cell, and the directors in the centre of the cell can be considered to be homeotropic (i.e. substantially perpendicular to the substrates). The response time of pi-cells is very fast (sub-millisecond) compared to twisted nematic devices. However, such a pi-cell also suffers from the disadvantage that the dark state of the cell is undesirably highly chromatic (blue) when used between parallel polarisers (or in reflection with a single polariser), as will be described in more detail later.

It is an object of the present invention to provide a fast switching twisted liquid crystal device which is less chromatic than a conventional pi-cell.

According to the present invention, there is provided a twisted liquid crystal device comprising a liquid crystal layer, first and second alignment layers disposed on opposite sides of the liquid crystal layer, the first and second alignment layers having respective alignment directions which are mutually inclined, a first linear polariser disposed on the opposite side of the first alignment layer to the liquid crystal layer, and means for applying a variable voltage across the liquid crystal layer, the liquid crystal layer having a twisted liquid crystal structure and being arranged for operation in surface switching mode with first and second regions of the liquid crystal layer respectively adjacent the first and second alignment layers acting, in use, like first and second active optical retarders having mutually inclined optic axes (the slow axes).

The term "alignment direction" as used herein relates to that of the director (i.e. the direction of orientation of the liquid crystal molecule) at the surface of the alignment layer under consideration. The liquid crystal orientation at any point in space is generally described by the unit vector termed the director:

$$\hat{n} = (n_x, n_y, n_z)$$

where $n_x$, $n_y$ and $n_z$ are the respective vectors on three mutually perpendicular axes x, y and z of the laboratory frame, in which x and y are in the plane of the alignment layer and z is parallel to the normal of the plane of the alignment layer.

Similarly, the liquid crystal director at a surface can be defined as:

$$\hat{n}_s = (n_{xs}, n_{ys}, n_{zs})$$

Then, for a defined surface-normal parallel to the z-axis, each alignment direction within a cell is given by:

$$\hat{d} = s_z \cdot \frac{n_{zs}}{|n_{zs}|} \cdot \frac{(n_{xs}, n_{ys})}{\sqrt{n_{xs}^2 + n_{ys}^2}}$$

where ŝ is the unit surface-normal vector extending perendicularly from the alignment surface into the liquid crystal.

In the special case where there is no pretilt ($n_{zs}=0$), then $$\hat{d} = (n_{xs}, n_{ys}) \text{ or } \hat{d} = (-n_{xs}, -n_{ys})$$

which are equivalent configurations.

For example, when a liquid crystal surface is aligned by rubbing using buffing means, the alignment direction is given by the direction in which the buffing means moves across the alignment surface from the initial point of contact therewith, tilted out of the surface by an amount equal to the pretilt so generated.

The term "active" as used herein in relation to the optical retarders is intended to mean that the optical retardation can be changed (by varying the voltage applied across the liquid crystal layer), as opposed to a passive optical retardation plate whose optical retardation is fixed.

It is known that the pi-cell may be used as a wide viewing angle, fast switching white/black device by switching the total optical retardation of the cell between a retardation of zero and a half wave plate ($\lambda/2$) for operation between mutually perpendicular linear polarisers. However, the half wave plate retardation condition is only satisfied for light of one wavelength ($\lambda$), and combined with the wavelength dependence of the transmittance of light passing through the liquid crystal layer (i.e. the optical dispersion of the liquid crystal), this can give an undesirable coloured appearance at the half wavelength condition (yellow between crossed polarisers or blue between parallel polarisers, depending upon the wavelength for which the half wavelength condition is chosen). The device according to the present invention maintains the advantages of the pi-cell mode in terms of fast switching speeds but is more achromatic without adding any extra complexity to the fabrication of the device.

It is preferred for the device to be arranged such that, in use, the first and second regions act like a pair of active optical retarders which are substantially optically de-coupled. Optical de-coupling to a sufficient extent takes place when the liquid crystal director (i.e. the averaged orientation of the long molecular axis of the liquid crystals) in an intermediate region of the liquid crystal layer, between the first and second regions, is at a tilt angle of greater than 60° relative to the first and second alignment layers. Such optical decoupling of the first and second regions of the liquid crystal layer in the device according to the present invention can be achieved by applying a sufficient voltage across the liquid crystal layer to cause the liquid crystal director tilt angle in the intermediate region to exceed 60°. The voltage at which this takes place is determined by the physical properties of the liquid crystal material as well as the geometry of the liquid crystal cell. The optical path difference (d.$\Delta$n—where d is the thickness and $\Delta$n is the birefringence of the liquid crystal layer) is a determining factor. It is preferred for d.$\Delta$n (at 589 nm) of the liquid crystal layer at zero field to be greater than about 1.0 $\mu$m in order to enable the desired optical retardations in the first and second regions to be achieved practically for low birefringence materials (e.g. ZLI-4792, $\Delta$n=0.097). For high birefringence materials (e.g. BL037, $\Delta$n=0.28), a d.$\Delta$n of at least about 1.4 $\mu$m is appropriate. In terms of the thickness (d) of the liquid crystal layer (i.e. the cell thickness), this equates to d>about 5 $\mu$m (more preferably >about 7 $\mu$m) for high birefringence materials, and d>about 10 $\mu$m (more preferably >about 15 $\mu$m) for low birefringence materials.

A transparent divider (eg a thin transparent membrane) may be provided which serves to separate the first and second regions of the liquid crystal layer physically from one another and which thereby assists in optical decoupling of the active optical retarders in use. At least one surface of the divider may be rubbed or otherwise aligned to provide a zero pretilt (planar) or a 90° pretilt (homeotropic) with the latter being preferred for ease of achievement in practice. The alignment direction on at least one surface of the divider may be parallel or anti-parallel to that of the respective facing alignment layer, inducing a Freedericksz-or a pi-cell structure.

Alternatively, the alignment direction on at least one surface of the divider may be inclined with respect to that of the respective facing alignment layer in a similar way to that in which the alignment directions of the first and second alignment layers are mutually inclined. This alternative arrangement permits excellent achromaticity to be achieved within one device, rather than requiring two actively driven cells.

For devices intended to be operated in transmissive mode, the device will further comprise a second linear polariser which is disposed on the opposite side of the second alignment layer to the liquid crystal layer and which has a polarisation axis disposed at an angle relative to the alignment direction of the second alignment layer. In such devices, the device is preferably operated in use at or between two finite voltages, one of said finite voltages producing effectively an optical retardation of light passing through the device which is within the range $3\lambda/4$ to $\lambda/4$, preferably substantially $\lambda/2$ (substantially half wave retardation); and the other of said finite voltages producing effectively a near-zero optical retardation of such light.

In general, for transmission mode devices, and preferably where the polarisation directions of the first and second polarisers are mutually parallel, if $\beta$ is the angle between the polarisation or absorption axis of the first liner polariser and the alignment direction of the first alignment layer, then the alignment direction of the second alignment layer is at an angle of substantially $3\beta$ to the polarisation or absorption axis of the first linear polariser.

For devices intended to be operated in a reflective mode, a reflector will be disposed on the opposite side of the second alignment layer to the liquid crystal layer. In such devices, the device is preferably operated in use at or between two finite voltages, one of said finite voltages producing effectively a net optical retardation within the range $3\lambda/8$ to $\lambda/8$, preferably substantially $\lambda/4$ (substantially quarter wave retardation) in respect of light passing in each direction between the first linear polariser and the reflector; and the other of said finite voltages producing effectively a near-zero optical retardation of such light. The reflector may also act as part of the voltage-applying means.

In general, for reflective mode devices, if $\beta$ is the angle between the polarisation or absorption axis of the polariser and the alignment direction of the first alignment layer, then the alignment direction of the second alignment layer is at an angle of substantially $(2\beta+45°)$ relative to the polarisation or absorption axis of the linear polariser.

The liquid crystal molecules in the first and second regions may have equal or unequal pretilt angles. Thus, instead of the first and second regions being operated so as to have equal optical retardations, one region could have the optical retardation of a half wave plate ($\lambda/2$) and the other region could have the optical retardation of a quarter wave plate ($\lambda/4$). Such a combination can be used for operation of the liquid crystal display in reflective mode. Unequal pretilt angles can be achieved, for example, by forming the alignment layers of different materials and/or by performing different rubbing or other alignment procedures on the two alignment layers.

In one convenient embodiment, for operation in transmissive mode, the alignment directions of the alignment layers are mutually inclined at an angle of 45°± about 12.5° or 135°± about 12.5°, the pretilt angles of the liquid crystal molecules adjacent the alignment layers are substantially the same, and the device is operated so that each of the optical retarders acts as a half-wave retarder at a certain voltage. The alignment direction of one of the alignment layers in this embodiment is most preferably disposed at an angle of about 22.5° relative to the polarisation or absorption axis of said first linear polariser. In the transmissive mode, it is desirable that the ratio of the effective optical retardations produced by the first and second regions in use does not vary by more than ±25% from the preferred value of 1 (i.e. from 0.75 to 1.25). This can be achieved by ensuring that the respective pre-tilt angles are of sufficiently similar values.

In another convenient embodiment, for operation in reflective mode, the alignment directions of the alignment layers are mutually inclined at an angle of 60°± about 15° or 120°± about 15°, the pretilt angles of the liquid crystal molecules adjacent the alignment layers are different, and the device is operated so that the optical retarder defined by the liquid crystal molecules having the lower pretilt angle acts like a half-wave retarder whilst the optical retarder defined by the liquid crystal molecules having the higher pretilt angle acts like a quarter-wave optical retarder. The alignment direction of the alignment layer associated with the half-wave retarder is most preferably disposed at an angle of 15°± about 10° relative to the polarisation or absorption axis of said first linear polariser. In the reflective mode, it is desirable that the ratio of the effective optical retardations produced by the first and second regions in use does not vary by more than ±25% from the preferred value of 2 (i.e. from 1.5 to 2.5). This can be achieved by ensuring that the respective pre-tilt angles are of sufficiently different values.

The device may include one or more passive (or fixed) optical retarders, and/or more than one achromatic twisted surface mode device according to the invention may be used in series to improve achromaticity further and, it is believed, viewing angle and operating voltage. The or one of the passive optical retarders may be defined by the above-mentioned transparent divider.

In cases where a reflective mode device includes a passive optical retarder, the optic axes of the three optical retarders may be disposed, with respect to the polarisation or absorption axis of the first linear polariser, at angles a, b and c, where angle a is in the range of 2 to 25° inclusive; angle b is $(x.a)°$, where x is in the range of from 1 to 10, inclusive; and angle c is $(2(b-a)+45)°$. Preferably, angle a is 6.9° and x=5.

It is also within the scope of the present invention to provide a further passive optical retarder, said further passive optical retarder being of the negative birefringent type, i.e. one having its optic axis perpendicular to the plane of the retarder. Such a retarder can partially compensate the out-of-plane component of the switched active liquid crystal cell, and thereby enable an improved viewing angle to be achieved.

The device of the present invention is considered generally more suitable for active matrix driving than for passive matrix driving if grey scale is required. The active matrix may be of the thin film transistor (TFT) or of the metal-insulator-metal (MIM) type. In a reflective mode device, the TFT or MIM elements are preferably disposed on the opposite side of the reflector to the LCD cell so as to maximise the aperture ratio of the device.

The device may include colour filters in a manner known per se for LC colour display devices to enable a colour display with an improved achromatic dark state to be achieved.

The liquid crystal layer may be constituted by twisted (or chiral) nematic liquid crystal molecules or a chiral dopant may be incorporated in the liquid crystal in order to stabilise one twist state over the other in the twisted structure. Any liquid crystal material having a positive dielectric anisotropy may be employed. Materials having a higher birefringence are preferred to enable lower cell thicknesses to be employed. The material may be a non-TFT (thin-film-transistor) type material, of which BL037 (Merck Ltd) is a good example, or it may be a TFT-type material, of which TL213 (Merck Ltd) is a good example.

It is also within the scope of the present invention to provide an assembly of at least one device according to the present invention in combination with another LCD device, which may include a pi-cell, a Freedericksz-cell, a HAN-cell or a TN cell.

The present invention also resides in a liquid crystal device comprising first and second liquid crystal layers, and means for applying a variable voltage across each of the liquid crystal layers, the first and second liquid crystal layers being of electrically controllable birefringence and arranged so as to act, in use, like respective first and second active optical retarders having mutually inclined optic axes.

Each of the first and second liquid crystal layers may be defined by a respective liquid crystal cell independently selected from a pi-cell, a Freedericksz-cell, a HAN-cell and a TN cell.

Figure 1:
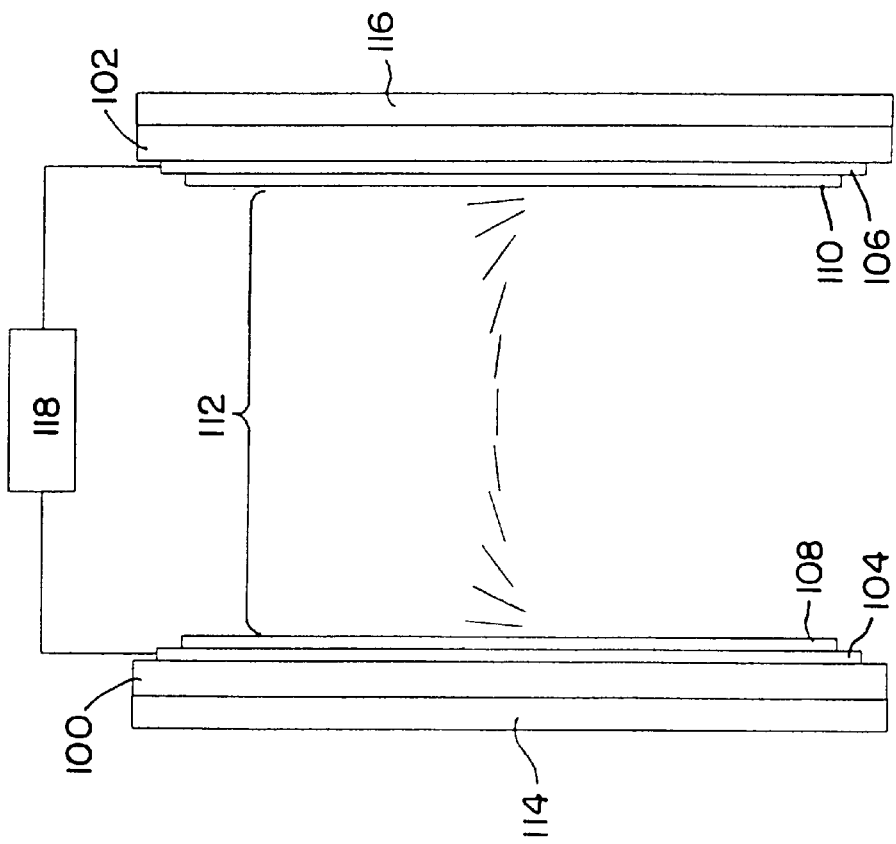
Figure 3:
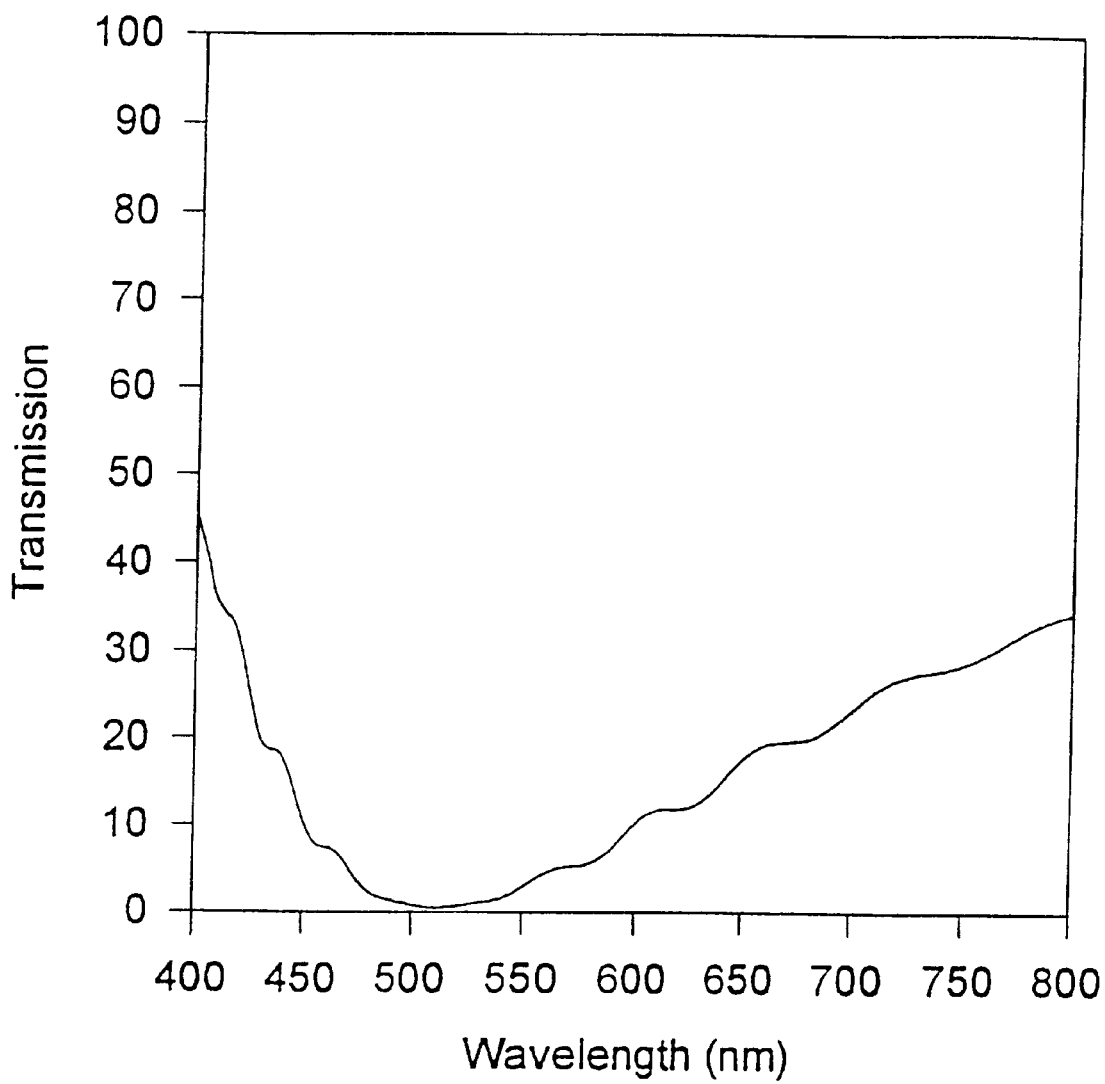
Figure 5:
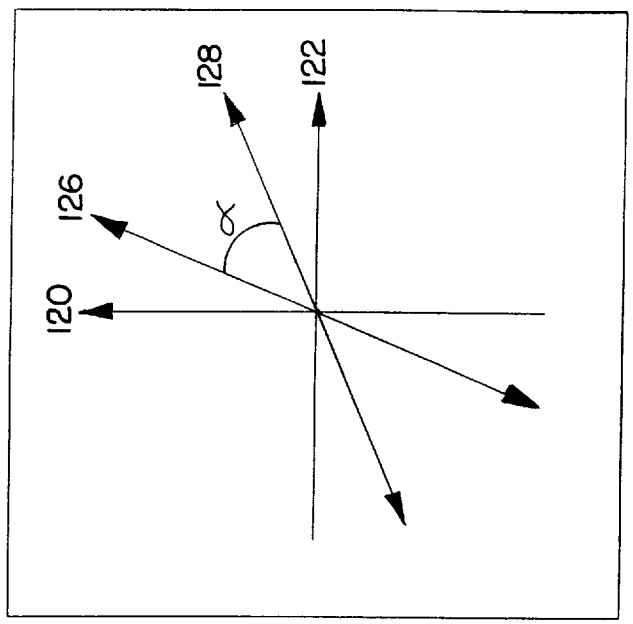
Figure 4:
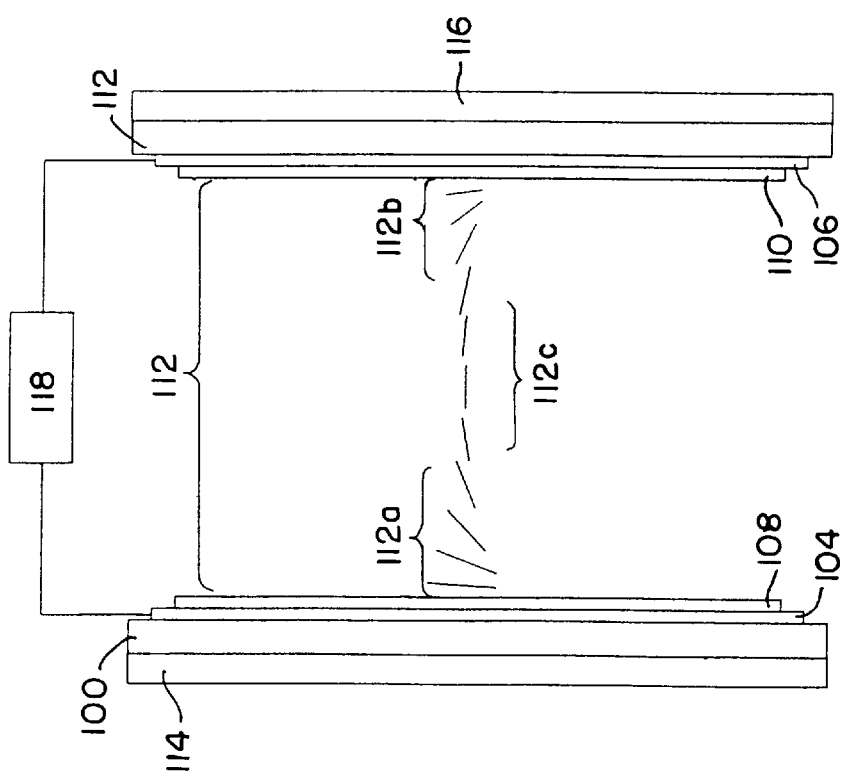
Figure 6:
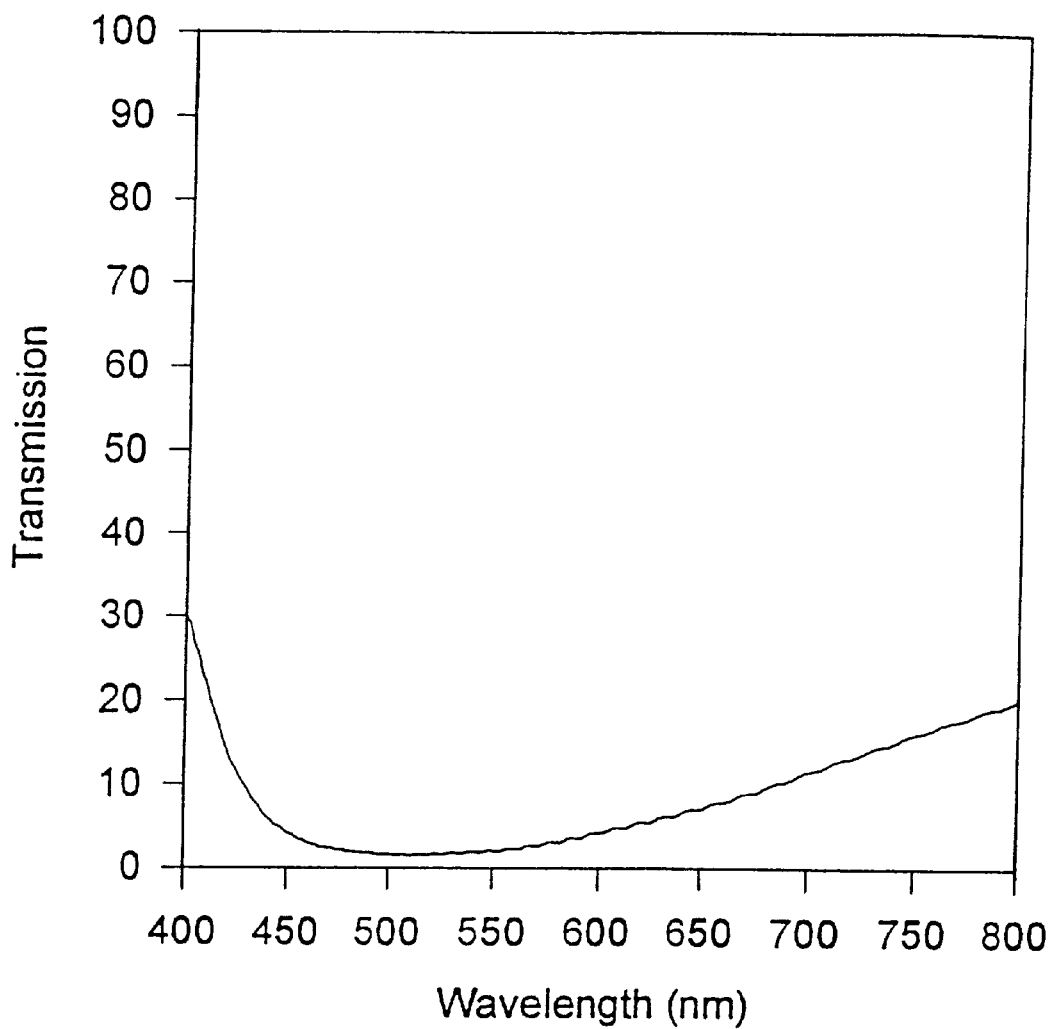

Some of the above described features and arrangements are defined in the appended claims which also define other features and arrangements. Further details of the advantages of the present invention will become apparent from the following description in relation to the accompanying drawings, in which:

FIG. 1 is a schematic cross-section through a conventional liquid crystal device incorporating a pi-cell, FIG. 2 is a schematic end view of the device of FIG. 1 showing the alignment direction of alignment layers in the pi-cell in relation to the polarisation axes of polarisers forming part of the device, FIG. 3 is a graph showing the variation of measured transmission with wavelength for the device of FIG. 1 between mutually parallel linear polarisers when a voltage is applied across the liquid crystal layer of the pi-cell such as to produce a half wave optical retardation at 515 nm therein, FIG. 4 is a schematic side view showing operation of an achromatic twisted surface mode liquid crystal device (ATSM LCD) according to the present invention, designed for operation in transmissive mode, FIG. 5 is an end view of the device of FIG. 4 showing the alignment directions of alignment layers in the device of FIG. 4 in relation to the polarisation direction of linear polarisers also forming part of the device of FIG. 4, and further showing alternative possible alignment directions, FIG. 6 is a graph showing measured transmission with wavelength for the device of FIG. 4 but with mutually parallel linear polarisers, with a voltage being applied across a liquid crystal layer in the device such as to produce a net half wave optical retardation at 515 nm, wherein the twist angle in the liquid crystal layer at zero field is 45° and there is a splayed director profile.

Figure 7:
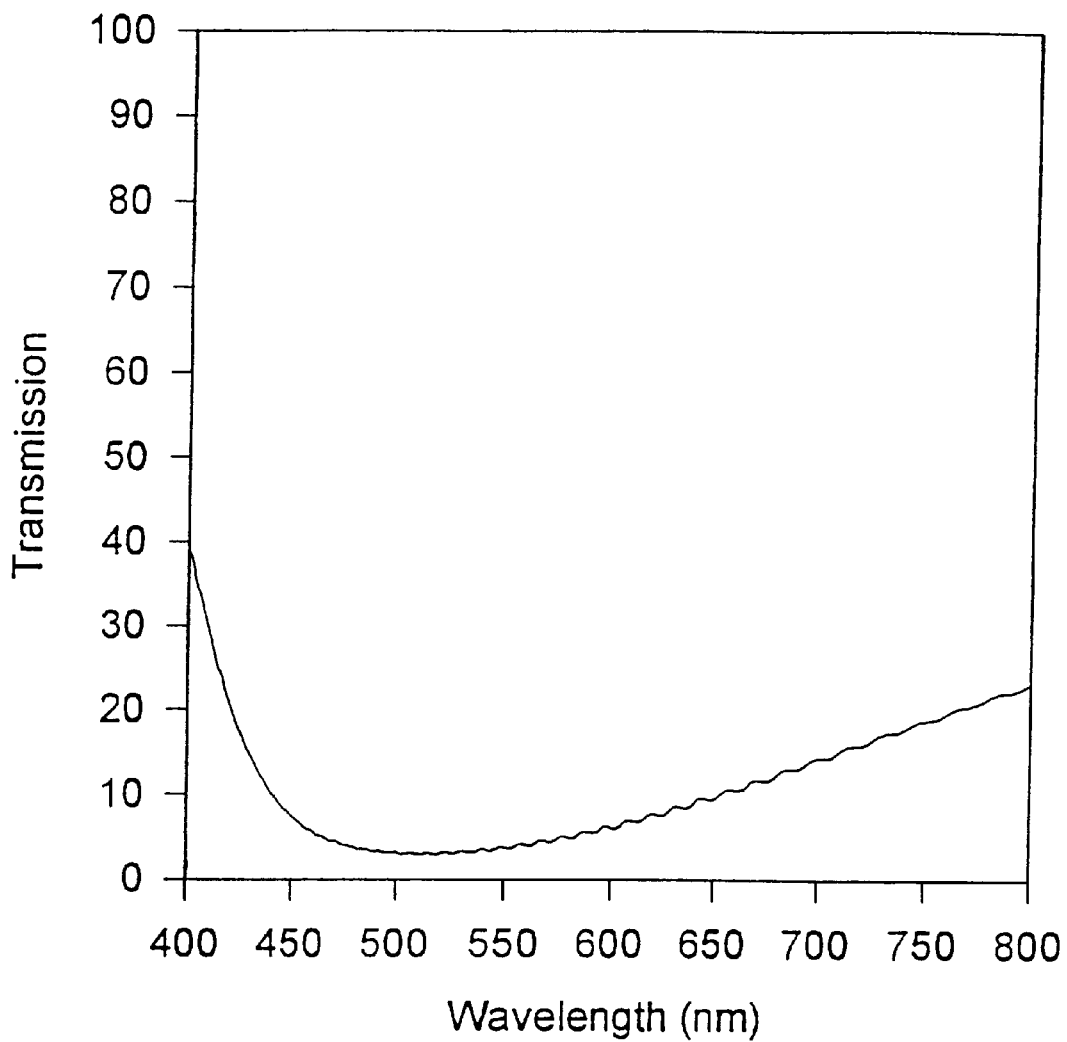
Figure 8:
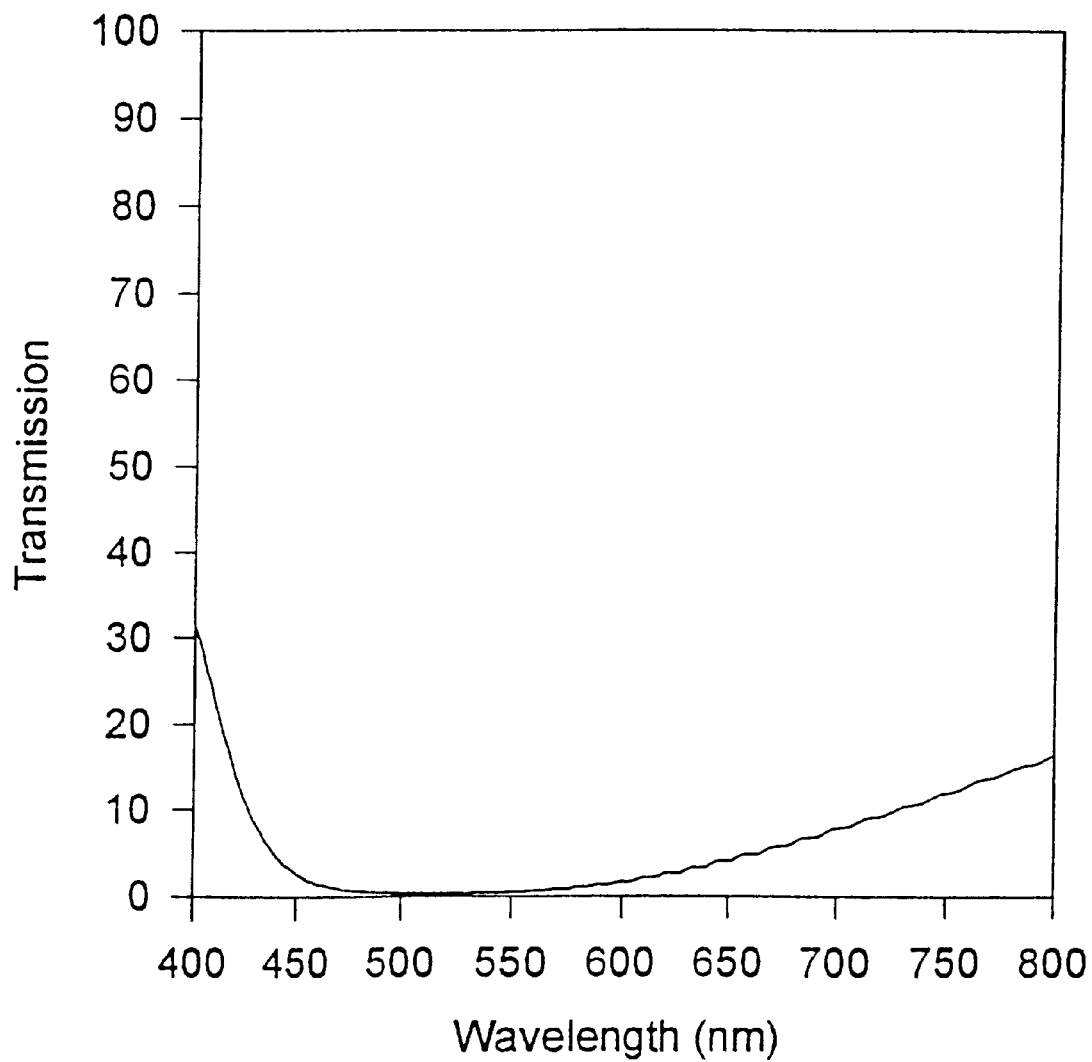
Figure 10:
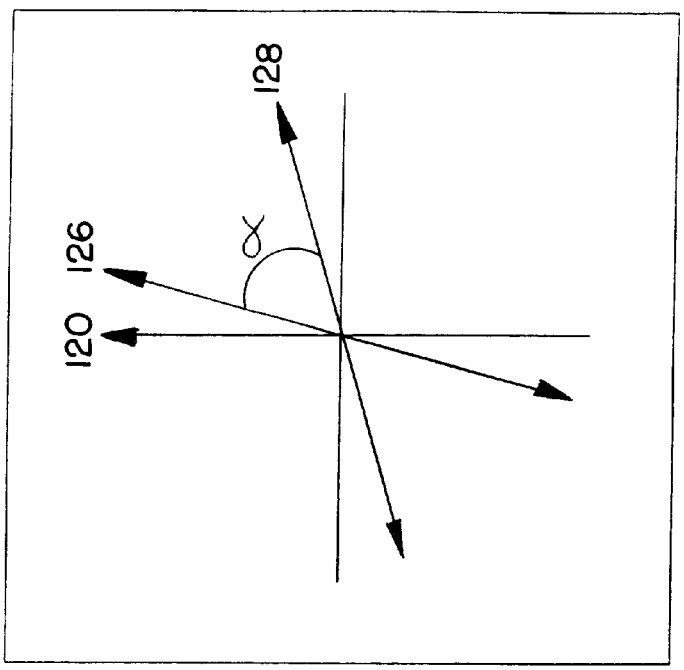
Figure 9:
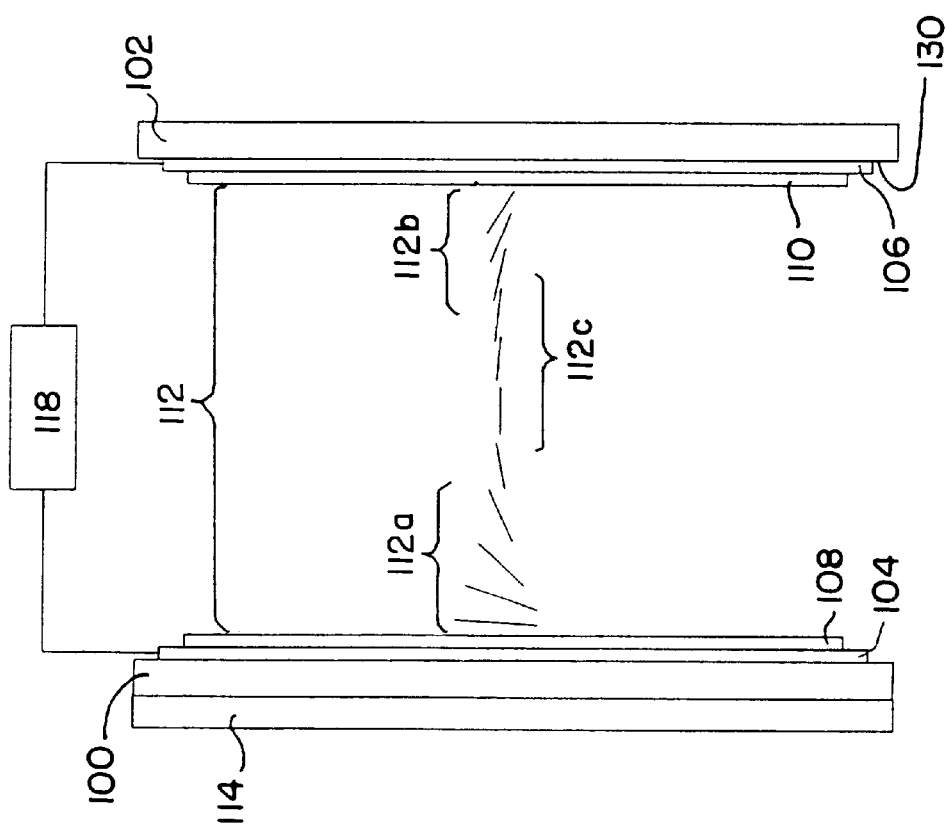
Figure 11:
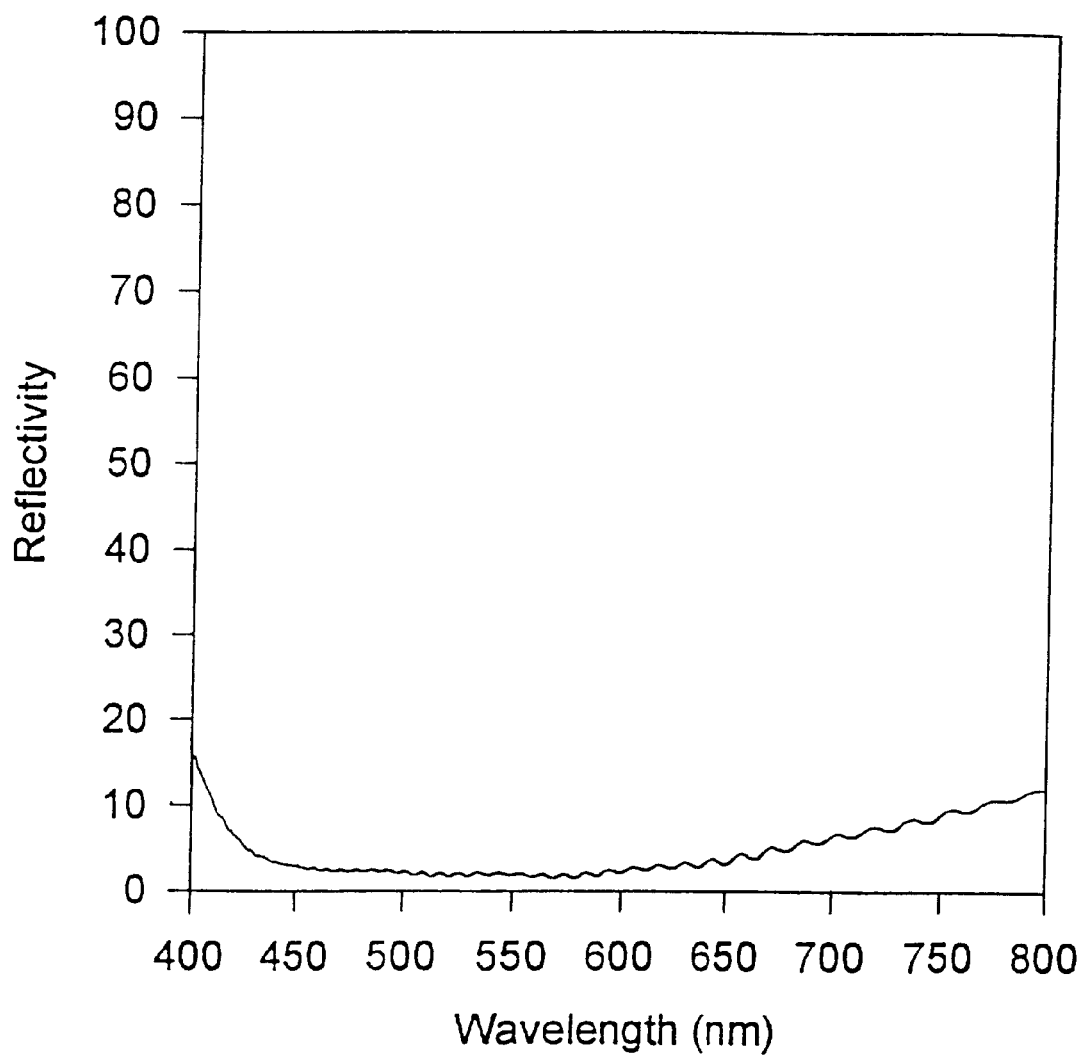
Figure 12:
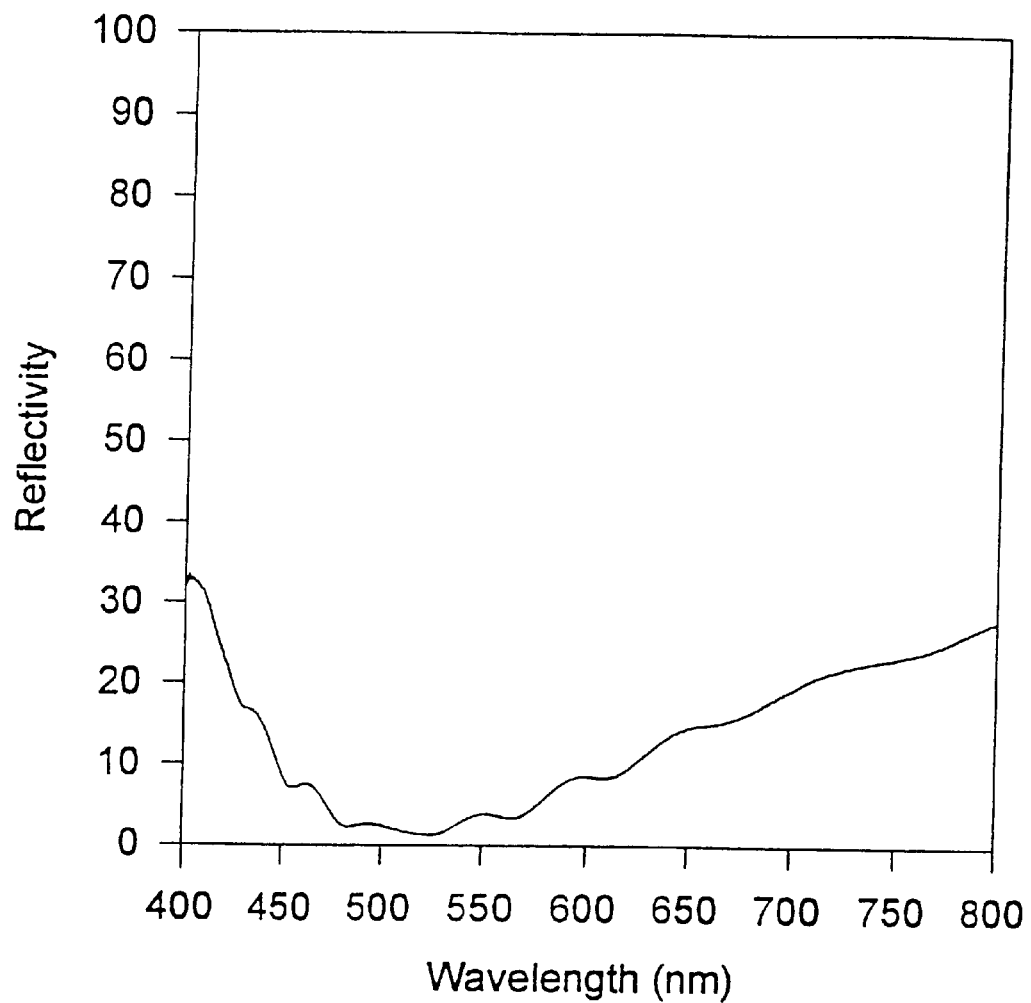
Figure 14:
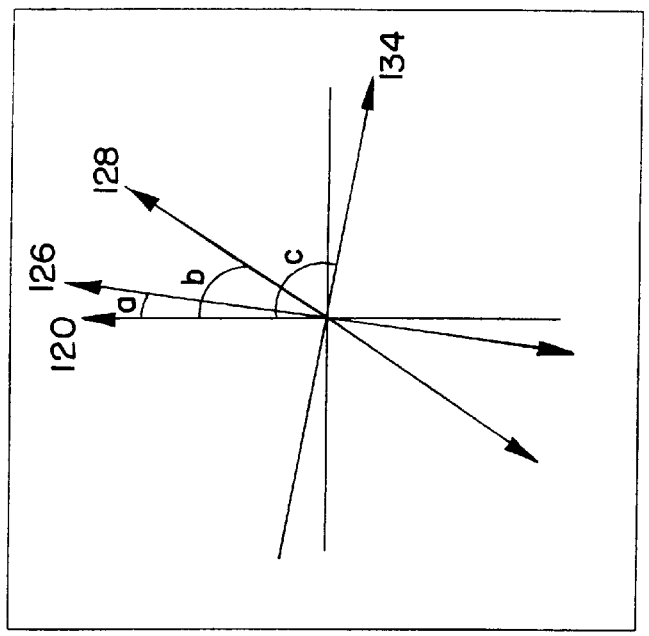
Figure 13:
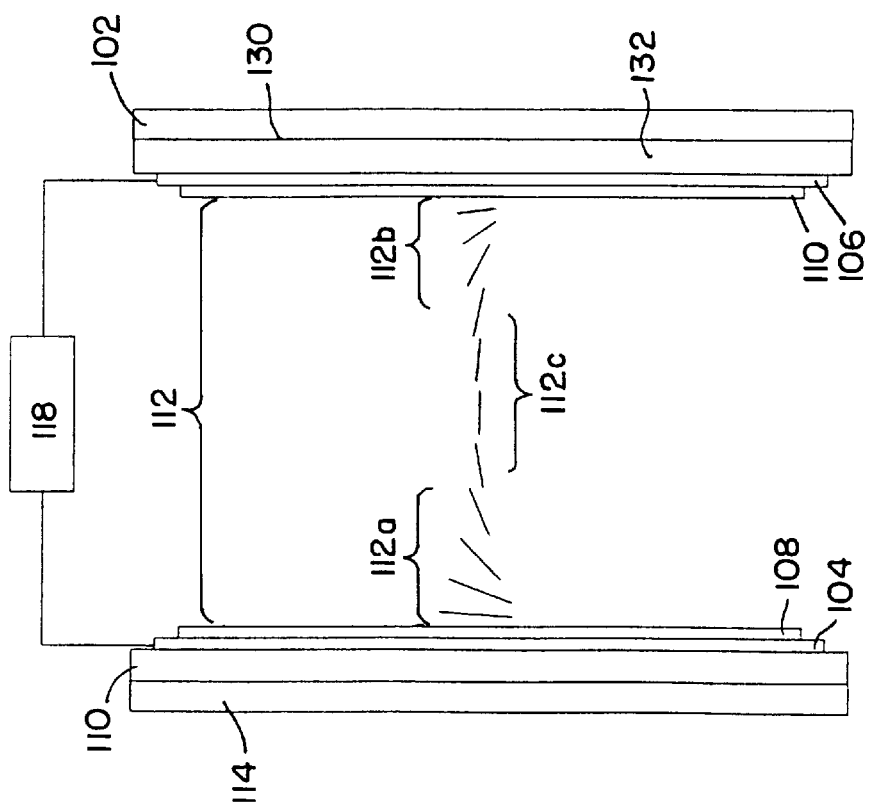
Figure 15:
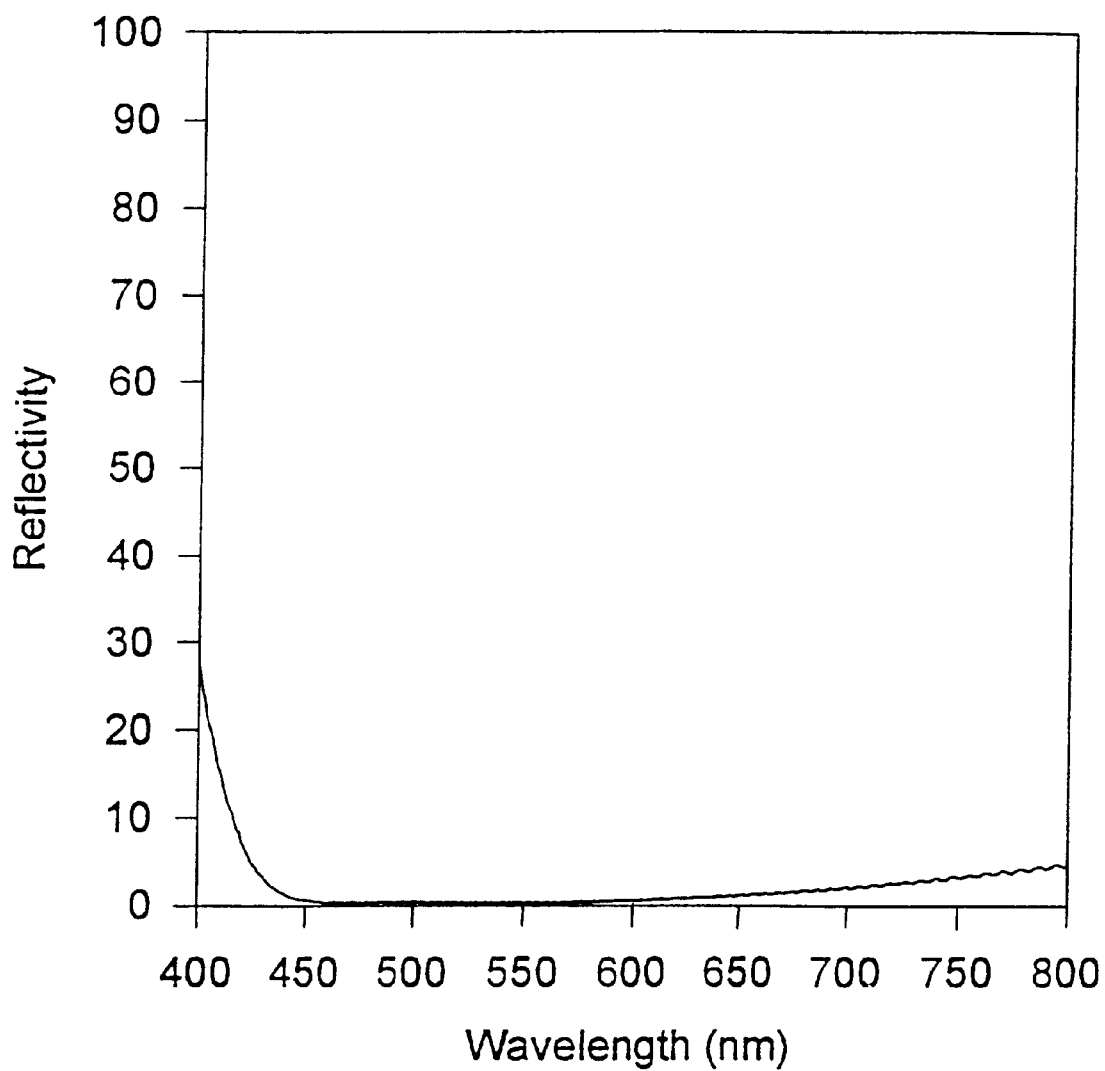
Figure 16:
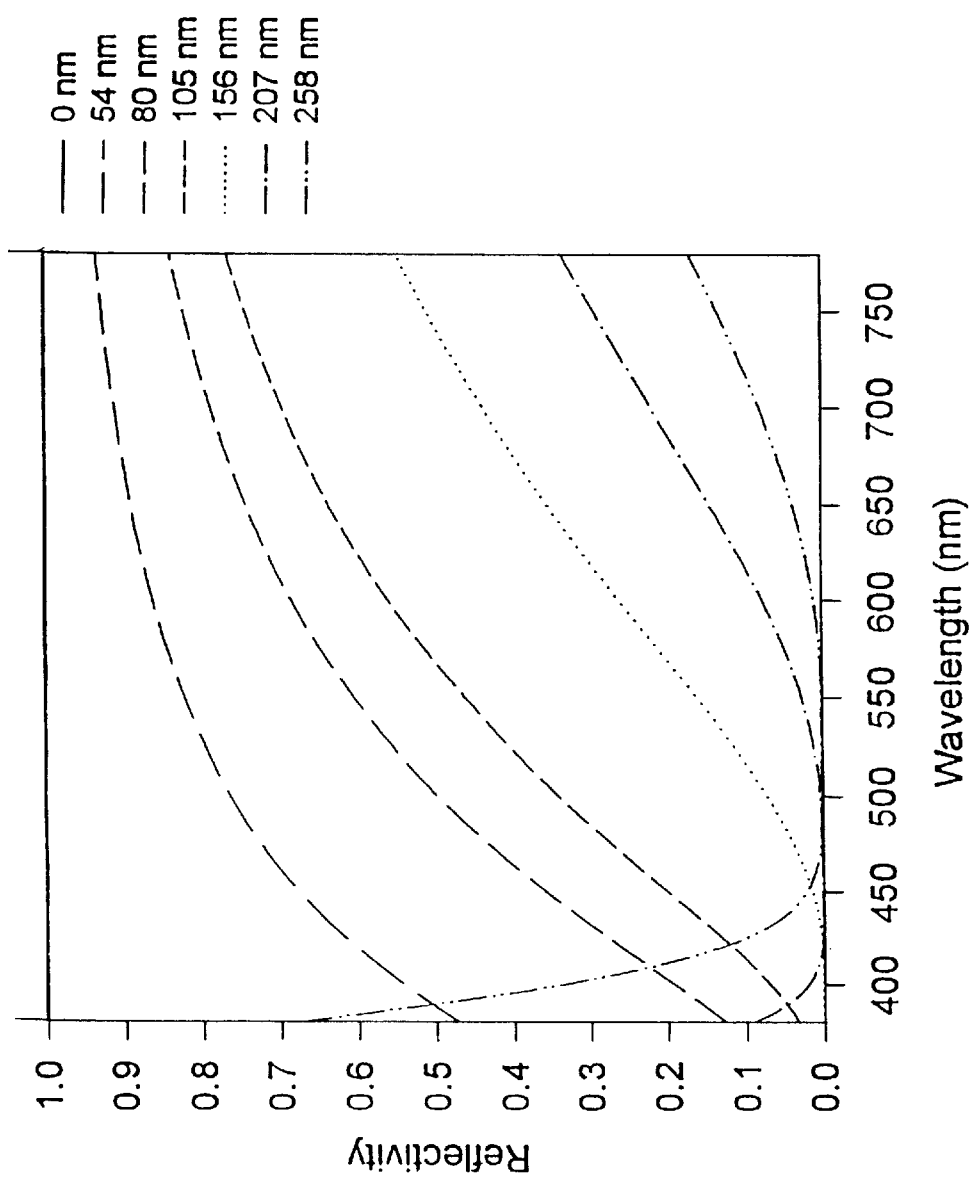
Figure 17:
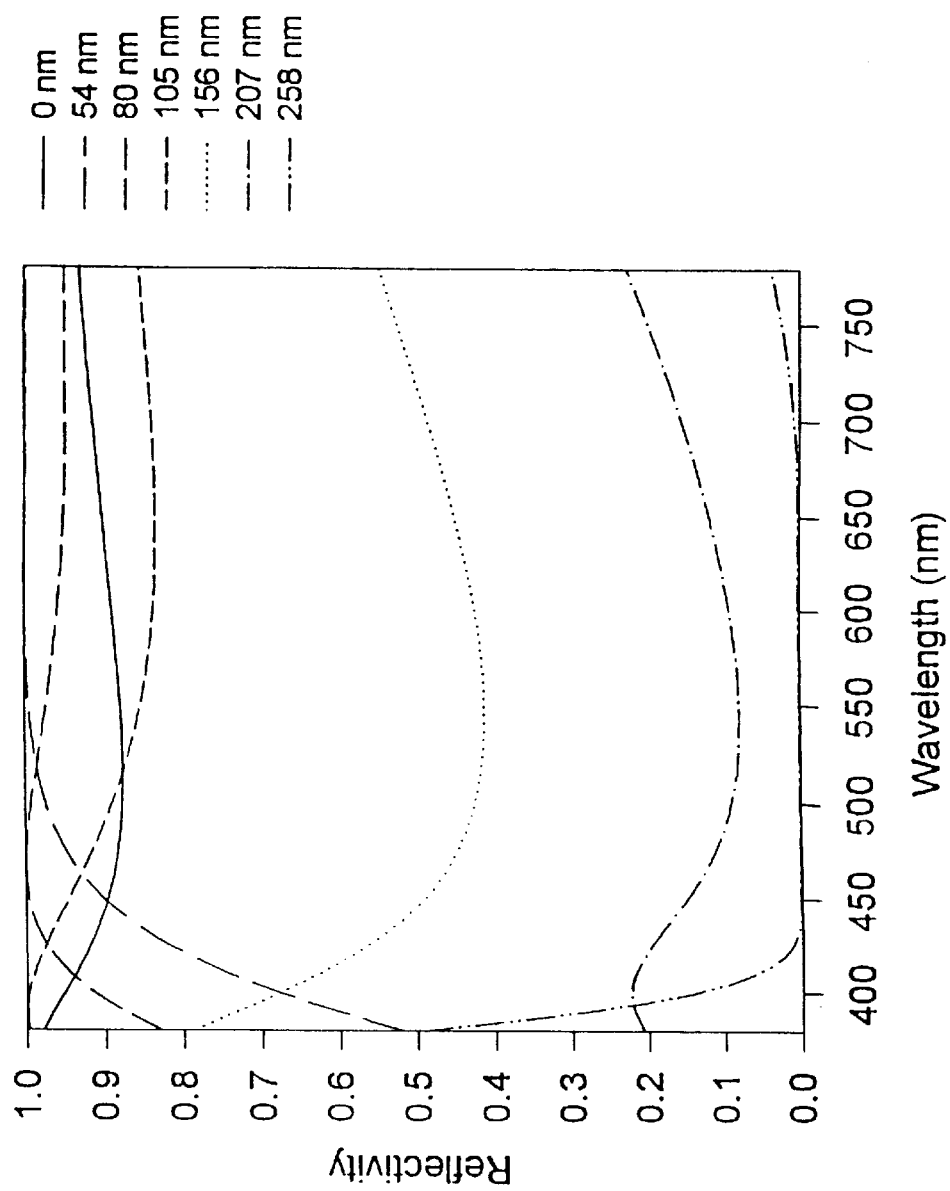
Figure 19:
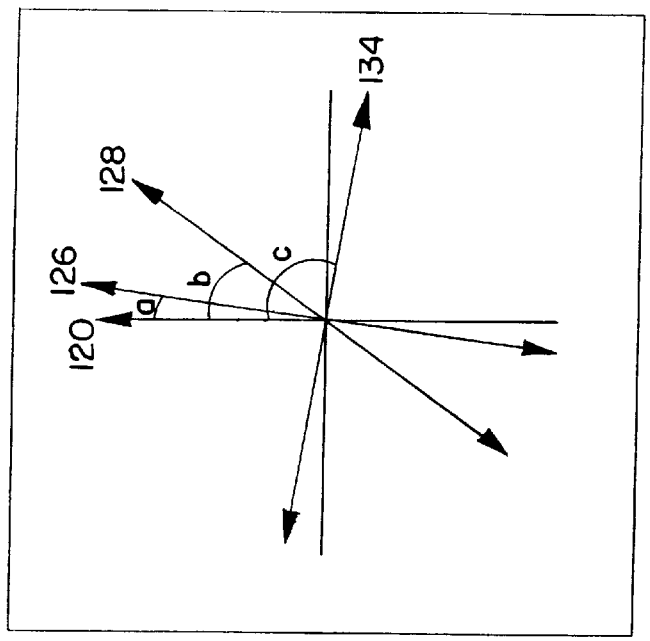
Figure 18:
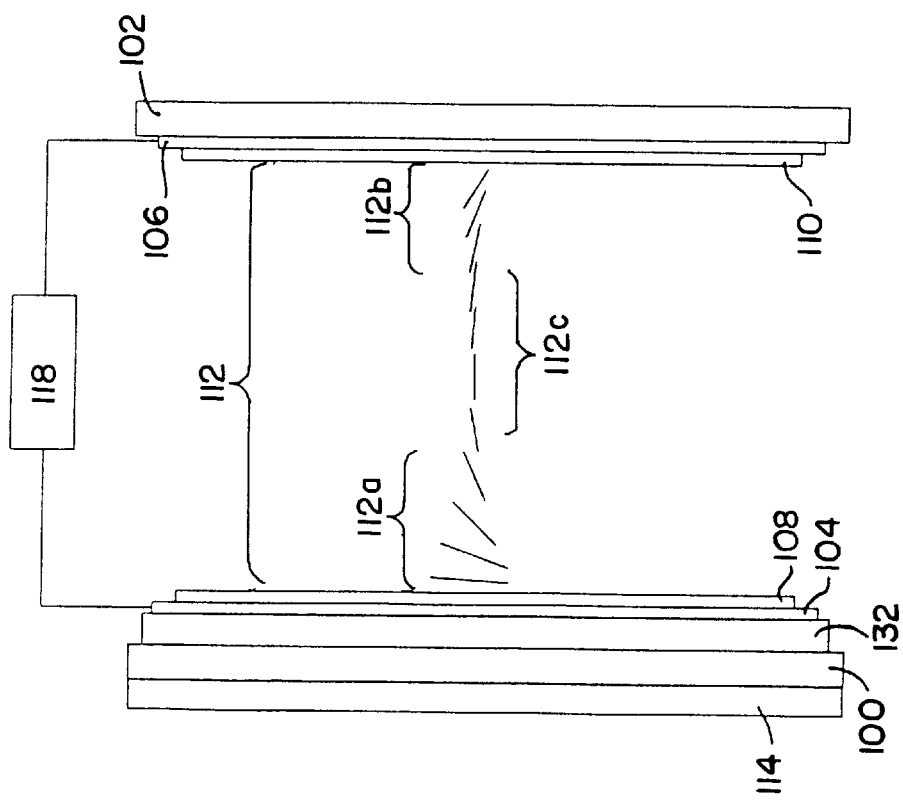
Figure 20:
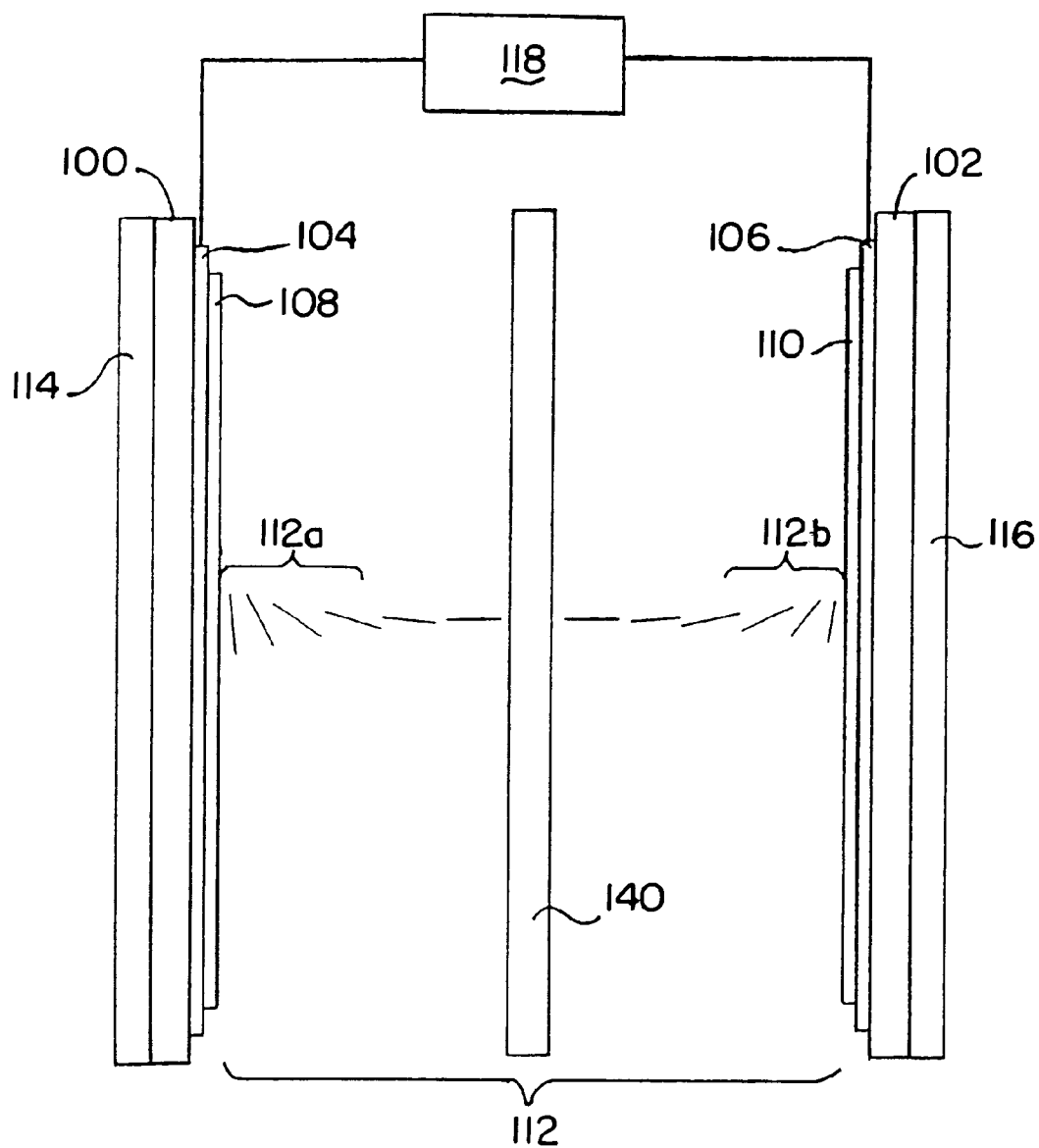
Figure 21:
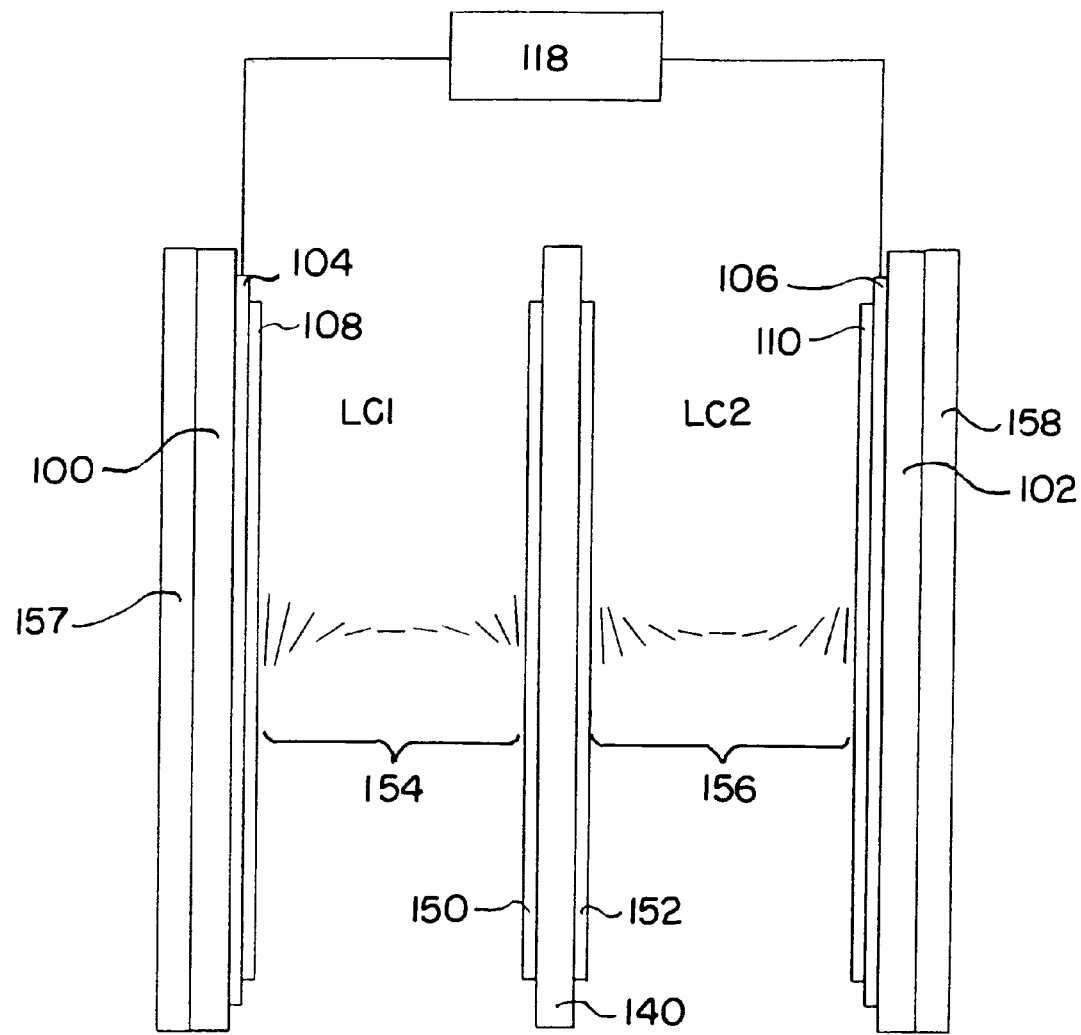
Figure 22:
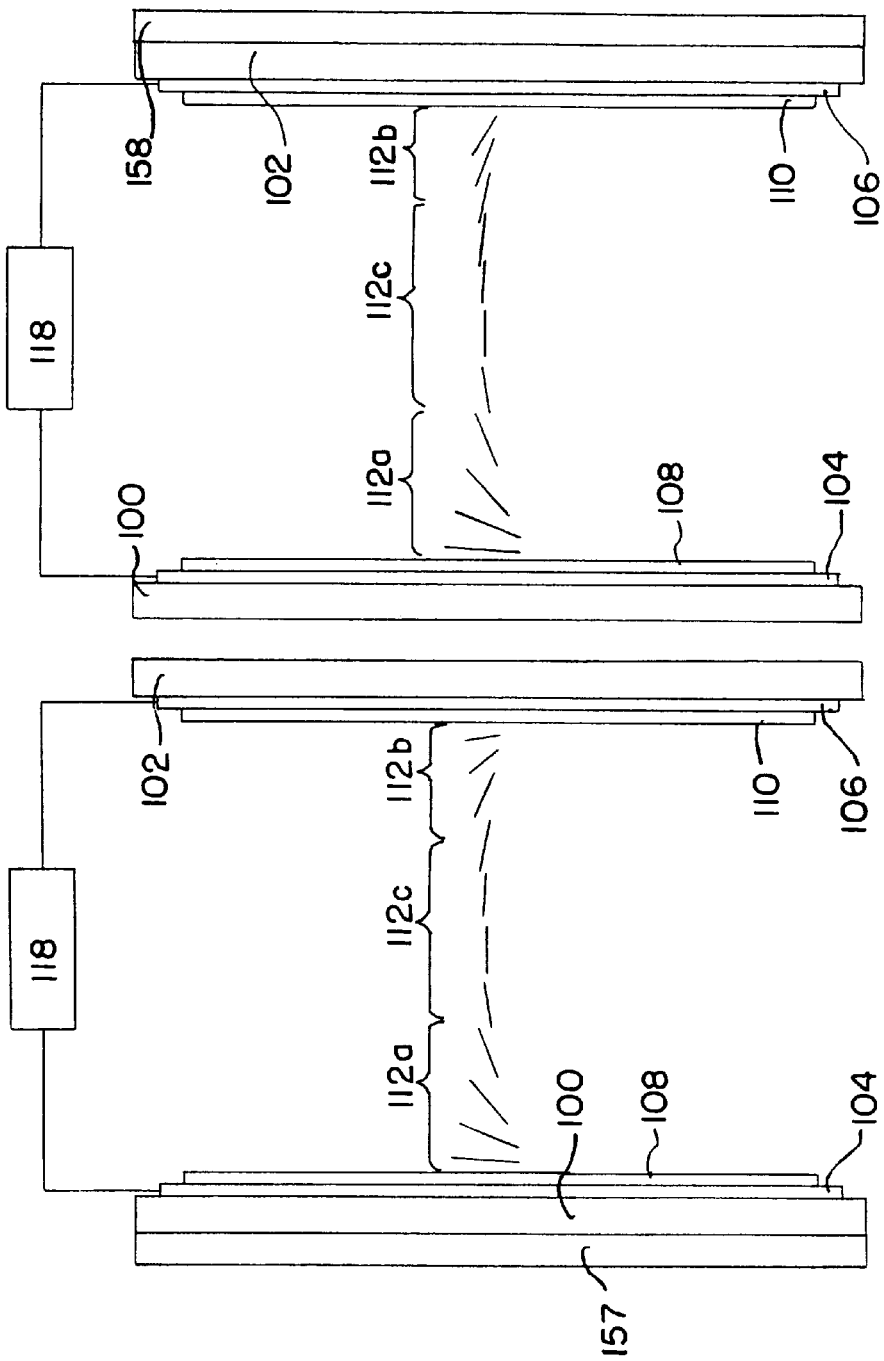
Figure 24:
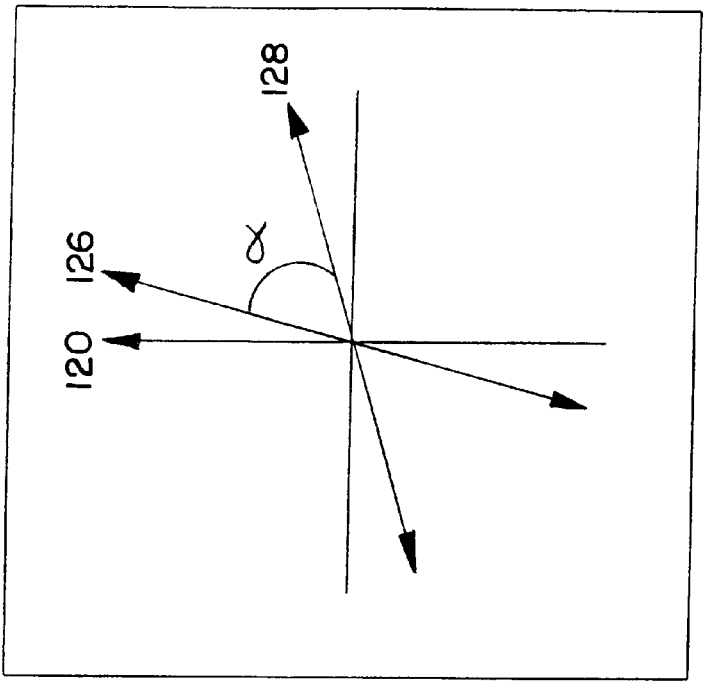
Figure 23:
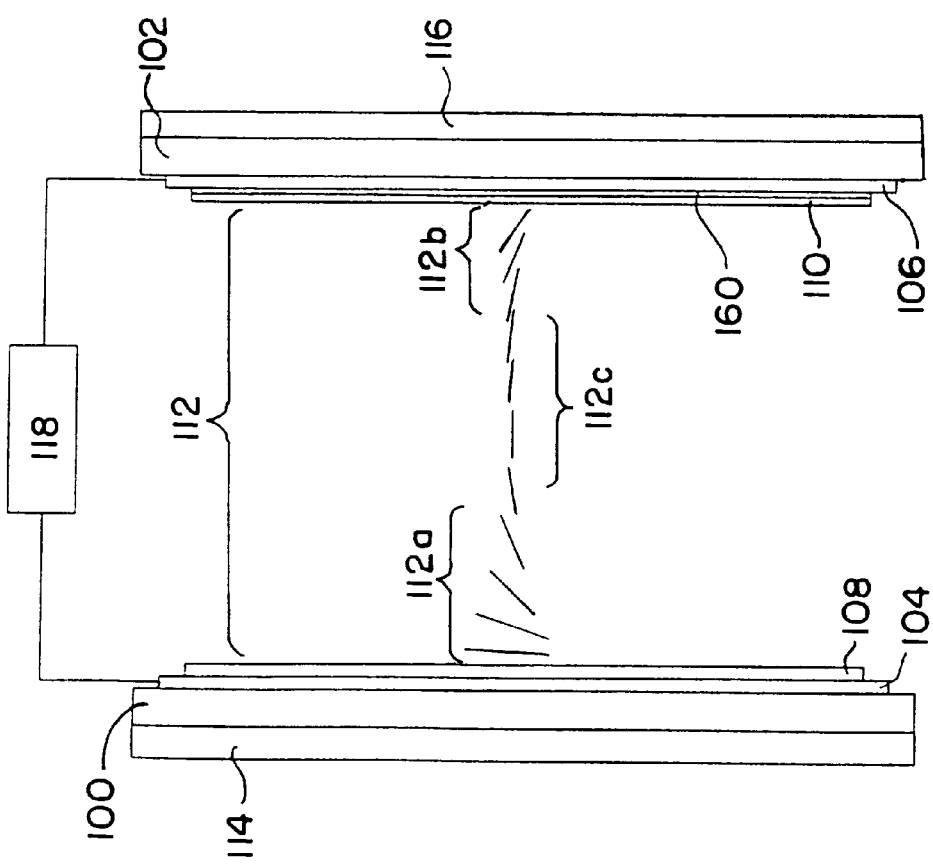

FIG. 7 is a graph similar to that of FIG. 6, but where the twist angle at zero field is 135° with an unsplayed director profile, FIG. 8 is a graph similar to that of FIG. 6 but where the twist angle at zero field is 45° with an unsplayed director profile, FIG. 9 is a schematic cross-section through another embodiment of ATSM LCD according to the present invention, designed to be operated in reflective mode, FIG. 10 is a schematic end view of the device of FIG. 9 showing the alignment directions of alignment layers in the device of FIG. 9 in relation to the polarisation direction of linear polarisers also forming part of the device of FIG. 9, and further showing alternative possible alignment directions, FIG. 11 is a graph showing measured reflectivity versus wavelength for a device of the type described in Example 4 below at a voltage applied across the liquid crystal layer such as to give close to a net quarter wave optical retardation, FIG. 12 is a graph showing the reflectivity of a conventional device incorporating a pi-cell at quarter wave condition with an alignment direction of the alignment layers at 45° to the direction of polarisation of the linear polariser of the device, FIG. 13 is a schematic cross-sectional view of another embodiment of ATSM LCD according to the present invention, designed for operation in reflective mode using a passive optical retarder between the active liquid crystal region of the device and the reflector, FIG. 14 is a schematic end view of the device of FIG. 13 showing the alignment directions of alignment layers in the device of FIG. 13 in relation to the polarisation direction of linear polarisers also forming part of the device of FIG. 13, and further showing alternative possible alignment directions, FIG. 15 is a graph showing measured reflectivity versus wavelength obtained for the sample of Example 5 below at a voltage such as to give close to a net quarter wave optical retardation, FIG. 16 is a graph plotting calculated reflectivity against wavelength for the sample of Example 4 for the retardations shown (equivalent to changing the applied voltage), FIG. 17 is a graph similar to that of FIG. 16 for the sample of Example 5, FIG. 18 is a schematic cross-section of a further embodiment of ATSM LCD according to the present invention, designed for use in reflective mode using a passive optical retarder between the linear polariser and the active liquid crystal layer, FIG. 19 is a schematic end view of the device of FIG. 18 showing the alignment directions of alignment layers in the device of FIG. 18 in relation to the polarisation direction of linear polarisers also forming part of the device of FIG. 18, and further showing alternative possible alignment directions, FIG. 20 is a schematic cross-section of a still further embodiment of ATSM LCD according to the present invention, wherein a transparent divider is used to achieve effective de-coupling of surface switching regions of the liquid crystal layer, as opposed to use of a high field, FIG. 21 is a schematic cross-section of a further liquid crystal device in which two planar, aligned liquid crystal cells separated by a divider are driven by a common driver, FIG. 22 is a schematic cross-section of a still further liquid crystal device in which two planar, aligned liquid crystal cells are independently driven, and FIGS. 23 and 24 are views similar to FIGS. 9 and 10 of a further embodiment of device according to the present invention.

The drawings of the various devices do not show the various layers of the device to scale but have been produced to demonstrate more clearly the features of the present invention and the advantages thereof over conventional pi-cells.

Referring now to FIGS. 1 and 2 of the drawings, the conventional liquid crystal device illustrated therein comprises a pi-cell defined by first and second mutually parallel glass plates 100 and 102, respectively, having electrodes 104 and 106 formed on their mutually facing surfaces. Respective first and second rubbed alignment layers 108 and 110 are provided over the electrodes 104 and 106 and a liquid crystal layer 112 fills the gap between the alignment layers 108 and 110. First and second linear polarisers 114 and 116 are provided on opposite sides of the pi-cell. The polarisation axes 120 and 122 may be mutually perpendicularly disposed as illustrated in FIG. 2, or may be mutually parallel, depending upon the chosen type of operation of the device. The alignment layers 108 and 110 are rubbed so as to produce an alignment direction 124 (FIG. 2) which is disposed at an angle of 45° with respect to the polarisation axis 120 of the polariser 114.

A variable voltage driver 118 is provided to enable a voltage to be applied via the electrodes 104 and 106 across the liquid crystal layer 112. The electrodes 104 and 106 may be arranged to apply the voltage across any one or more parts of the layer 112 or over the whole of such layer 112 depending upon the intended use of the device.

In use, the pi-cell is arranged to be driven by the driver 118 via the electrodes 104 and 116. At one voltage level, a zero optical retardation condition occurs in the layer 112. When the polarisation axes 120 and 122 are mutually perpendicularly disposed, this produces minimum transmission of the light through the device. However, when the polarisation axes 120 and 122 are mutually parallel, this condition is intended to produce maximum light transmission. At another voltage level, the voltage across the liquid crystal layer 112 is such as to produce a net half wave optical retardation. Changing the voltage level varies the wavelength at which optical retardation occurs. When this is used with mutually perpendicular polarisers 114 and 116, maximum transmission of light through the device takes place. On the other hand, when the polarisers 114 and 116 are mutually parallel, light transmission through the device is intended to be a minimum.

FIG. 3 shows the measured transmission with wavelength for a device of the type described above but where the polarisation axes 120 and 122 of the polarisers 114 and 116 are mutually parallel, and where the voltage across the liquid crystal layer 112 is such as to produce a half wave optical retardation with the intention of producing extinction of transmitted light. However, as can be seen from FIG. 3, transmission only approaches zero in respect of light at wavelengths in the region of 470 to 530 nm, and there is an appreciable transmission of light at higher and lower wavelength regions. Thus, the dark state is undesirably highly chromatic (blue).

Referring now to FIGS. 4 and 5 of the drawings, the ATSM LCD of the present invention is of a similar basic structure to the device of FIG. 1 and similar parts are accorded the same reference numerals. In this device, however, the alignment layers 108 and 110 are rubbed or otherwise aligned so that their alignment directions 126 and 128, respectively, are mutually inclined by angle α (see FIG. 5). In this embodiment, the angle α is about 45°, and the alignment direction 126 of alignment layer 108 is disposed at about 22.5° relative to the polarisation axis 120 or the absorption axis of polariser 114. Light is transmitted across the device from left to right as viewed in FIG. 1 so that the second polariser 116 constitutes an analyser. However, alternative alignment directions are shown in the bottom left hand quadrant of FIG. 5 so that there may be either a 45° or a 135° twist to the liquid crystal molecules across the liquid crystal layer 112 at zero voltage.

In use, the device of FIGS. 4 and 5 is operated at or between two finite voltages in a surface switching mode such that first and second regions 112a and 112b of the liquid crystal layer 112 adjacent the first and second alignment layers 114 and 116 are not only substantially optically de-coupled (i.e. the maximum liquid crystal director tilt angle in an intermediate region 112c of the liquid crystal layer 112 is >60° and preferably approaches 90°), but are also mutually inclined. These regions 112a and 112b therefore effectively act like two separate, active (i.e. variable or tunable) uniaxial optical retarders having mutually inclined optic axes. At one particular voltage, these active optical retarders will be half-wave optical retarders for a particular wavelength of light. It is to be appreciated that, in this condition, the first and second regions 112a and 112b do not act precisely as uniaxial half-wave optical retarders which are totally optically decoupled. This would require all the liquid crystal directors in the first region 112a to be mutually aligned, all the crystal directors in the second region 112b to be mutually aligned, and the liquid crystal directors in the region 112c to be homeotropic. Such a condition is not practically achievable but can be approached to a sufficient extent to enable the beneficial effects of two uniaxial optical retarders with optic axes, aligned with the alignment directions 126 and 128, respectively, to be achieved. Thus, the first and second regions 112a and 112b are described herein as acting, in use, like first and second active optical retarders having mutually inclined optic axes.

Two half wave optical retarders with their optic axes mutually inclined at 45° will rotate linearly polarised light by 90° regardless of the incident azimuthal linear polarisation angle. If the optic axis of the first half wavelength optical retarder is at 22.5° to the incident linear polarisation, then the best achromatic behaviour is obtained compared to a single half wavelength retarder (between mutually parallel or mutually crossed linear polarisers). Where the optic axis of the first half wave optical retarder is at an angle of 67.5° to the incident linear polarisation and the optic axis of the second half wave optical retarder is at 22.5°, the same situation arises. In other words, the alignment directions 126 and 128 illustrated in FIG. 5 can be interchanged.

EXAMPLE 1

An LCD of the general type illustrated in FIG. 4 was prepared in which the alignment layers 108 and 110 were formed of polyimide of about 6° pretilt angle and rubbed at 45° relative to each other (i.e. at 45° and in substantially the same direction). The gap between the alignment layers 108 and 110 was set at 10 μm and this gap was filled with nematic liquid crystal material BL037 (Merck Ltd). After filling the device with such liquid crystal material to form the liquid crystal layer 112, the liquid crystal molecules had a 45° twist angle between the alignment layers 108 and 110 with the liquid crystal directors in a splayed configuration. FIG. 6 shows the transmission versus wavelength of this device between mutually parallel linear polarisers 114 and 116 at a voltage of about 3.7 volts, such voltage being that required to give an overall half wave retardation at 515 nm. Comparing the results illustrated in FIG. 6 with the equivalent spectral transmission for the conventional pi-cell as illustrated in FIG. 3, it can be seen that the transmitted intensity in FIG. 6 is much more achromatic than that in FIG. 3.

In a modification, a passive optical retarder (in this embodiment, the optical retardation was about 75 nm, but this is non-critical) was added in series with the device with its optical axis inclined at −45° to the polarisation axis 120 of the input polariser 114. This effectively reduces the overall retardation of the device, thus allowing it to be switched between half wave optical retardation and zero optical retardation using two finite voltages. The total response time was measured to be about 10 ms.

EXAMPLE 2

The sample of Example 1 was held at a large voltage (in this embodiment, 10 V, although it could have been any value greater than 5 V) for a few minutes. On removing the voltage, the liquid crystal was found to have transformed to a 135° twist with an unsplayed structure. At a voltage of about 3.2 V, the liquid crystal sample can again be put into a state in which the first and second regions 112a and 112b thereof are sufficiently decoupled and of a suitable thickness to have half wave optical retardations. The stability of this state compared with that of the sample of Example 1 is affected by the pretilt angle of the liquid crystal molecules in such regions 112a and 112b and the physical properties of the liquid crystal material employed.

Using the same configuration of linear polarisers 114 and 116 as described above in relation to FIGS. 4 and 5, the optical transmission obtained is illustrated in FIG. 7, which can be seen to be very similar to that of FIG. 6. The slight differences arise from the different director profiles in the two Examples. This Example has an advantage over the more usual way of making a twisted LCD with a twist angle greater than 90° in that no dopant is required to induce the larger twist angle. Using no dopant gives a twist profile in which the twist changes more rapidly in the cell centre, this giving a better decoupling of the first and second regions 112a and 112b in the liquid crystal layer. However, right or left hand chiral dopants could be added to the nematic liquid crystal to stabilise one twist state with respect to the other (if a particular twist state is desired as the operating mode), depending upon the relative orientation of the alignment directions. The response time was measured in a similar way to the sample of Example 1 and found to be similar.

EXAMPLE 3

Example 1 was repeated, except that the two alignment layers 108 and 110 were rubbed at 135° relative to each other (i.e. at 45° and in a substantially anti-parallel direction), and that the surfaces developed a pretilt angle in the adjacent liquid crystal molecules in the regions 112a and 112b of only about 4°. For low pretilt values, the actual angle is not particularly critical and may typically be in the range of 1 to 6°. In this case, the liquid crystal took up a configuration with a 45° twist but with an unsplayed director profile. The optical transmission of the resultant device was measured in the same way as in Examples 1 and 2. The results are shown in FIG. 8. In this Example, a voltage of about 3.5 volts was required to operate the device with half wave optical retardation. At this voltage, the tilt angle in the centre of the region 112c was calculated to be 84°, as compared with about 4° at zero voltage. The decay response time of this Example was measured to be about 7 ms.

EXAMPLE 4

In reflective mode, better achromaticity than a single liquid crystal quarter wave optical retarder can be achieved by using a half wave optical retarder at 15° to the incident polarisation in series with a quarter wave optical retarder with its axis at 60° to the half wave optical retarder (i.e. at 75° to the incident polarisation). Such an arrangement is shown schematically in the device of FIGS. 9 and 10 where similar parts to the previously described devices are accorded the same reference numerals and which is designed to be used in reflective mode. Consequently, the second linear polariser 116 is dispensed with and replaced by a polarisation-preserving reflector (hereinafter called a "reflector") formed by a reflective film on the second glass plate 102. It is however within the scope of the present invention to retain the second linear polariser 116 and provide the reflector behind the second linear polariser 116. The reflectivity versus wavelength for the single linear polariser 114 and reflector, with the achromatic optical retarder provided by the liquid crystal layer 112 between the polariser and the reflector, is similar to the double half wavelength optical retarder described previously. However, it will be appreciated that, because the device is used in reflective mode, the alignment layers 108 and 110 cannot be interchanged as was noted hereinabove in relation to the embodiment of FIGS. 4 and 5.

In the device of this Example, the alignment layers 108 and 110 were prepared so as to impart different pretilt angles to liquid crystals molecules in regions 112a and 112b adjacent such layers. Both alignment layers 108 and 110 were formed of a polyimide which was initially rubbed to give a pretilt of about 2°. The surface of the alignment layer 110 was then subsequently overcoated with a liquid crystal gel layer as described in EP-A-0467456 whose disclosure is incorporated herein by reference. The thickness of such gel layer can be controlled to give the desired pretilt angle. Measurement of the pretilt angle in a separate cell gave a value of around 35°. In principle, any alignment technique which gives a suitable pretilt angle may be used. A cell of this type having a 10 μm thick gap between the alignment layers 108 and 110 with alignment (rubbing) directions mutually inclined by 60° was filled with nematic liquid crystal material, BL037 (Merck Limited). At zero field, the liquid crystal director had a 60° twist with a splayed director profile. On applying a voltage above 5 V, this readily changed to a 120° twist with an unsplayed tilt profile (at zero field), and was the state in which the measurements were recorded. In principle, either state could be used as the operating mode by the addition of small amounts of chiral dopant as described above, to stabilise one state with respect to the other. FIG. 11 shows the reflectivity of such a device disposed between a linear polariser and a reflector at a voltage of about 3.5 V, which was the voltage required to give an overall quarter wave optical retardation. The equivalent spectral transmission for a single liquid crystal retardation device at quarter wave optical retardation is shown in FIG. 12. As can be seen from a comparison of FIGS. 11 and 12, the reflectivity obtained in the device according to the present invention is much more achromatic. The finite offset of the minimum at 515 nm is due to the ratio of the optical retardations in the two regions 112a and 112b not being in the exact ratio of 2:1 (half wave:quarter wave).

In a modification, a passive optical retarder (in this embodiment, the optical retardation was about 75 nm, but this is non-critical) was added in series with the liquid crystal layer 112, with the optical axis of the passive optical retarder being inclined at −45° to the polarisation axis 120 of the polariser 114. This effectively reduced the overall optical retardation of the device and allowed the total optical retardation to be switched between quarter wave optical retardation and zero optical retardation for finite voltage. The total response time of the device was measured to be less than 7 ms.

As has been demonstrated in Example 3 above, the directions of alignment for either or both of the alignment layers 10 and 110 may be reversed (i.e. rotated through 180°). The overall optical effect at normal incidence will be similar, but the director profile will show either a 60° or a 120° twist at 0 V depending on the relative orientation. However, the viewing angle properties of the two modes will be different.

Referring now to FIGS. 13 and 14, the device illustrated therein is similar to the reflective mode device of FIGS. 9 and 10 and similar parts are accorded the same reference numerals. However, in this embodiment, a passive quarter wave optical retarder 132 (having an optical retardation of about 129 nm for light having a wavelength of 515 nm) is disposed between the reflector and the electrode 116. The alignment layer 108 is rubbed so that the active optical retarder defined in use by the region 112a adjacent the layer 108 has its optical axis 126 disposed at an angle a (in this embodiment, 6.9°) to the polarisation axis 120 of the linear polariser 114. The alignment layer 110 is rubbed so that the corresponding optical axis 128 lies at an angle b (in this embodiment, 34.5°) relative to the polarisation axis 120. The passive optical retarder 132 has its optical axis 134 lying at an angle c (in this embodiment, 100.2°) relative to the polarisation axis 120. It will be understood from the above that these angles correspond to the above-mentioned preferred ranges for angles a, b and c, wherein angle a being 6.9°, is in the range of 2 to 25° inclusive; angle b, being 34.5°, is (x.a)°, where x is 5 which is in the range of from 1 to 10, and angle c, being 100.2°, is (2(b−a)+45)°. Such an arrangement improves the overall achromaticity of both the black and intermediate grey states in use. The liquid crystal regions 112a and 112b adjacent the alignment layers 108 and 110 are decoupled and each are made to act like a half wave length optical retarder when an appropriate voltage is applied across the liquid crystal layer 112 by the driver 118. Thus, at such voltage, for light having a wavelength of 515 nm the liquid crystal regions 112a and 112b act like optical retarders having respective optical retardations equal to about 258 nm.

EXAMPLE 5

In this Example, use was made of a device having a structure similar to that described above in relation to FIGS. 13 and 14. The thickness of the liquid crystal layer 112 was the same as used in the preceding Examples, 10 μm. The alignment surfaces 108 and 110 were rubbed at an angle of 152.4° relative to each other (i.e. at 27.6° and in a substantially anti-parallel direction). The pretilt angles induced in the regions 112a and 112b by the alignment layers 108 and 110 was about 4°. In this Example, the liquid crystal molecules took up a configuration with a 27.6° twist but with an unsplayed director profile at zero field. The passive optical retarder 132 had an optical retardation of 129 nm, corresponding to a quarter wave plate for light having a wavelength of 515 nm. The optical axis 134 of the passive optical retarder 132 was oriented at an angle of 100° to the alignment direction 126. The linear polariser 114 had its polarisation axis 120 nominally at 0°. Applying a voltage of about 3.5 V using the driver 118 gave a minimum in the reflected intensity at about 515 nm, as shown in FIG. 15. The alignment direction 126 of the alignment surface 108 was disposed at an angle of 6.9° relative to the polarisation axis 120. As can be seen from FIG. 15, the device exhibits very low reflectivity over a wide range of wavelengths at the applied voltage of about 3.5 V. The response time of the device of this Example was found to be similar to that of Example 3 as the active switching element is the same.

The device of this Example has a number of advantages over that of Example 4. First, the device gives a better dark state due to the extra optical retarder. Secondly, the bright state of the device occurs at an optical retardation of around 85–90 nm instead of 0 nm as in Example 4. Thus, a second fixed optical retarder is not required to lower the operating voltage of the device. Experimentally, the voltage required to give a 100 nm retardation (visually about the brightest state) was found to be 10 V. Finally, the intermediate retardation states which could be used to give grey states in the device were found to be more achromatic in this Example as compared with Example 4, as will be apparent from FIGS. 16 and 17 which relate respectively to the devices of Examples 4 and 5. In FIG. 16, the line for 0 nm is a straight line corresponding to a reflectivity value of 1.0 for all wavelengths.

EXAMPLE 6

Referring now to FIGS. 18 and 19, the device illustrated therein is similar to the device of FIGS. 13 and 14 and similar parts are accorded the same reference numerals. In this embodiment, however, the passive optical retarder 132 is disposed between the linear polariser 114 and the active cell and is constructed as a half wave optical retarder. Also, in this embodiment, the pretilt angles of the liquid crystal molecules in the regions 112a and 112b of the liquid crystal layer 112 are unequal so as to produce retardations in the ratio of 2:1 whereby to enable the regions 112a and 112b of the liquid crystal layer 112 to act, at a particular wavelength, like half wave and quarter wave optical retarders, respectively. In this embodiment, the angles a, b and c between the polarisation axis 120 of the axial polariser 114 and the respective axes 126, 128 and 134 are 6.9°, 34.5° and 100.2°, respectively. In this Example, the black state of the device is the same as that of Example 5, although the spectral response of the grey levels is slightly different.

EXAMPLE 7

This Example describes various ways of using an ATSM device according to the present invention with two or more passive optical retarders. In one way of use, one passive optical retarder is used on each side of the liquid crystal cell. Thus, for example, the passive optical retarder between the linear polariser 114 and the cell is a half wavelength optical retarder disposed with its optical axis at an angle of 6.9° to the polarisation axis of the polariser 114, the axis 126 is disposed at an angle of 27.6 or 207.6° relative to the polarisation axis 120, the axis 128 is disposed at an angle of 102° (or 282°) with respect to the polarisation axis 120; whilst the second passive optical retarder is a quarter wave optical retarder disposed at an angle of 214.7° relative to the polarisation axis 120 of the linear polariser 114. In an alternative example, these angles are 6.5°, 25.7° (or 205.7°), 64.3° (or 244.3°) and 135°, respectively. It is to be appreciated, however, that many other combinations of angles are possible In another way of use, the passive optical retarders are used as first and second retarding elements, with the retarders provided by the regions 112a and 112b regions of the liquid crystal layer 112 defining third and fourth retarders and having a retardation of 2:1 as described in Examples 4 and 6. A higher number of passive optical retarders will produce a better achromaticity.

In addition to using a single active switchable liquid crystal layer with passive optical retarders, it is possible to use more than one of the liquid crystal devices described above to achieve essentially the same effect but even better achromaticity in the grey levels may be achieved. This technique applies both to transmissive and reflective mode devices. In one embodiment of such device, the configuration of Example 5 is employed with the modification that the quarter wave passive optical retarder is replaced by an active switchable device such as a pi-cell. In practice, the pixels of this display can be coupled to the device according to the present invention so that both devices are switchable from one set of drivers. In addition, it is considered possible to achieve the same fractional optical retardation change in both active layers for the same applied signal by appropriate choice of materials and display parameters.

Alternatively, two devices according to the present invention can be used in series. For a reflective display, the angular configurations described above in Example 7 can apply to each of these devices, with the active elements being made up from one of the types from Examples 1 to 3 (with appropriate alignment directions), and the active sample next to the reflector from a device of the type described in Examples 4 and 6 (again with suitable alignment directions).

Referring now to FIG. 20 where similar parts to those previously mentioned are accorded the same reference numerals. In this embodiment, a liquid crystal cell is provided which is divided into two parts, in this embodiment, by a divider in the form of a thin transparent membrane 140. Such membrane 140 can provide a homeotropic alignment of the directors of the liquid crystal molecules in the intermediate region 112c of the layer 112 so as to give completely decoupled regions 112a and 112b. Thus, the use of voltage to effect decoupling of the regions 112a and 112b of the liquid crystal layer 112 is avoided.

The alignment layers 108 and 110 induce alignment in appropriate directions, and different pretilt angles may be employed depending on the mode of operation required. Any of the arrangements and mode of operations described hereinabove may be employed, e.g. as described in any of Examples 1 to 4 and 6. The membrane 140 may define a passive optical retarder. The design of the device of FIG. 20 allows much thinner liquid crystal layers to be employed which leads to much quicker response times.

In FIG. 21, the device is similar to that of FIG. 20 in that a membrane 140 is provided as a divider, and similar parts are similarly numbered. In this embodiment, however, alignment layers 150 and 152 at opposite surfaces of the membrane 140 are such as to produce a non-homeotropic alignment of the adjacent liquid crystal directors. First and second liquid crystal cells LC1 and LC2 of electrically controllable birefringence (ECB) type having respective liquid crystal layers 154 and 156 are provided on opposite sides of the membrane 140. The alignment layers 108 and 150 of the first cell LC1 and the alignment layers 152 and 110 of the second cell LC2 are rubbed or otherwise aligned so that the alignment directions in the liquid crystal layers 154 and 156 are different. In use, the first and second liquid crystal layers 154 and 156 are arranged so as to act like respective first and second active optical retarders having mutually inclined optic axes, in a similar manner to the liquid crystal regions 112a and 112b of the previously described layer 112. Each cell LC1 and LC2 may be of any desired electrically controlled birefringence (ECB) type, eg a Pi cell, a Freedericksz cell a HAN cell or a twisted nematic cell.

Any of the arrangements and mode of operations described hereinabove may be employed, e.g. as described in any of Examples 1 to 4 and 6, can be adopted for the embodiment of FIG. 21. Like that of FIG. 20, the design of the device of FIG. 21 allows much thinner liquid crystal layers to be employed. Also like that of FIG. 20, the membrane 140 of FIG. 21 may define a passive optical retarder.

Alternatively, either or both of the cells of FIG. 21 may be of the type described above with reference to FIG. 4, 9, 13 or 18. In which case, the or each such cell has its own first and second regions 112a and 112b separated by region 112c, as described previously. Such a device may embody the features described above in Example 7. In FIG. 22, a similar arrangement to this is shown wherein the membrane 140 is omitted and each separate aligned cell is independently driven by a respective driver 118 instead of being commonly driven.

Elements 157 and 158 shown in FIGS. 21 and 22 constitute first and second linear polarisers, repectively, if the device is to be used in transmissive mode. Alternatively, the elements 157 and 158 constitute a linear polariser and a reflector, respectively, if the device is to be used in reflective mode.

Referring now to FIGS. 23 and 24, the device illustrated therein is similar to that of FIGS. 9 and 10, except that it is a transmissive mode device and that the second alignment layer 110 having the higher pretilt also acts as a fixed or passsive optical retarder. Substrate 102, which is partly coated with the transparent electrode 106, eg. of indium tin oxide (ITO), has a thin layer 160 of a polyimide spin coated onto it in a manner known per se. This polyimide layer 160 is rubbed to provide an alignment surface for an overlying liquid crystal layer which is to define the alignment layer 110. A mixture of a nematic liquid crystal material (for example E7 from Merck) and an acrylate-based material (for example RM82 from BDH Limited; RM253 from Merck or RM308 from Merck) is then spin coated as a thin (typically approximately 100 nm) layer onto the rubbed polyimide layer 160. The nematic component of the spun mixture is aligned by the surface of the polyimide layer 160, and is pretilted at such surface by a small angle (typically about 3°). The other surface of the layer 110 (ie. that surface which is to be in contact with the liquid crystal layer 112) is a free surface and is kept under a nitrogen atmosphere. At this free surface, the liquid crystal molecules adopt a high pretilt angle which is typically greater than 70°. Thus, the nematic component of the thin spun layer tends to adopt a tilt which varies continuously throughout its thickness from the small pretilt angle defined at the surface of the polyimide layer 160 to the much higher pretilt angle adopted at the free surface. The actual pretilt angle adopted by the liquid crystal molecules at the gas/liquid crystal interface is dependent upon the type of liquid crystal, the type of gas and the presence of any external magnetic or electric fields etc. In addition, the pretilt angle at such interface will depend upon the proximity of the underlying polyimide layer 160 (i.e. on the thickness of the spun layer forming the alignment layer 110)). A thinner layer 110 produces a smaller pretilt angle at the surface which is to contact the liquid crystal layer 112.

Exposing the nematic/acrylate mixture to UV light induces the acrylate component to undergo a photochemical reaction to convert the low molar mass acrylate to a polymer. The polymer so formed acts to fix the orientation and tilt structure of the liquid crystal molecules in the layer 110 permanently. Thus, following UV illumination, a thin nematic/polymer alignment layer 110 results having an exposed surface in which at least some of the nematic molecules are fixed and pretilted at some angle which is determined by the thickness of the layer 110. Thus, the pretilt angle can be tuned as desired.

Besides providing a pretilted alignment surface for the bulk liquid crystal layer 112, the thin nematic/acrylate polymer layer 110 described above is also inherently birefringent and thereby serves as a fixed optical retarder as noted above. The combination of these features is advantageous in the device according to the present invention where the first and second alignment layers 108 and 110 are mutually disposed at 90° or some other angle.

What is claimed is:

1. A twisted liquid crystal device comprising:
a liquid crystal layer;
first and second alignment layers disposed on opposite sides of the liquid crystal layer, the first and second alignment layers having respective alignment directions which are mutually inclined at an angle not equal to $n\pi/2$, where n is an integer;
a first linear polarizer disposed on the opposite side of the first alignment layer to the liquid crystal layer; and
means for applying a variable voltage across the liquid crystal layer,
wherein the liquid crystal layer has a twisted liquid crystal structure and is arranged for operation in surface switching mode with first and second regions of the liquid crystal layer respectively adjacent the first and second alignment layers acting, when in use, like first and second active optical retarders having mutually inclined optic axes.

2. A device as claimed in claim 1, wherein a driver means is provided which, when in use, applies a voltage across the liquid crystal layer such that, in an intermediate region of the liquid crystal layer, a tilt angle of liquid crystal molecules is greater than 60° relative to the first and second alignment layers.

3. A device as claimed in claim 1, wherein liquid crystal molecules in the first and second regions have substantially equal pretilt angles.

4. A device as claimed in claim 3, for operation in transmissive mode, wherein a second linear polarizer is disposed on the opposite side of the second alignment layer to the liquid crystal layer and has a polarization axis disposed at an angle relative to the alignment direction of the second alignment layer, and
wherein the device is operated in use at or between two finite voltages, one of said finite voltages producing effectively a substantially half-wave optical retardation of light which passes through the device, and the other of said finite voltages producing effectively a near-zero optical retardation of the light.

5. A device as claimed in claim 4, wherein the alignment direction of the second alignment layer is at an angle of substantially $3\beta$ relative to a polarization or absorption axis of the first linear polarizer, where $\beta$ is an angle between the polarization or absorption axis of the first linear polarizer and the alignment direction of the first alignment layer.

6. A device as claimed in claim 3, wherein the alignment direction of the first alignment layer and the alignment direction of the second alignment layer are mutually inclined at an angle of 45°± about 12.5° or 135°± about 12.5°.

7. A device as claimed in claim 3, wherein the alignment direction of one of the first and second alignment layers is disposed at an angle of about 22.5° relative to a polarization axis or an absorption axis of the first linear polarizer.

8. A device as claimed in claim 1, wherein liquid crystal molecules in the first and second regions have unequal pretilt angles.

9. A device as claimed in claim 8, for use in reflective mode, wherein a reflector is disposed on the opposite side of the second alignment layer to the liquid crystal layer.

10. A device as claimed in claim 9, wherein the device is arranged to be operated, when in use, at or between two finite voltages, one of said finite voltages producing effectively a net substantially quarter-wave optical retardation of light which passes in each direction between the first linear polarizer and the reflector, and the other of said finite voltages producing effectively a near-zero optical retardation of the light.

11. A device as claimed in claim 10, wherein the alignment direction of the first alignment layer and the alignment direction of the second alignment layer are mutually inclined at an angle of 60°± about 15° or 120°± about 15°, and
wherein the device is arranged to be operated so that, at said one of the finite voltages, that one of said first and second regions which has the lower pretilt angle acts like a half-wave optical retarder, whilst the other of the first and second regions acts like a quarter-wave optical retarder.

12. A device as claimed in claim 11, wherein the alignment direction of the alignment layer associated with that one of the first and second regions of the liquid crystal layer acting like a half-wave optical retarder is disposed at an angle of 15°± about 10° relative to a polarization axis or an absorption axis of the first linear polarizer.

13. A device as claimed in claim 9, wherein the alignment direction of the second alignment layer is at an angle of substantially (2β+45°) relative to a polarization or absorption axis of the first linear polarizer, where β is an angle between the polarization or absorption axis of the first linear polarizer and the alignment direction of the first alignment layer.

14. A device as claimed in claim 9, further comprising at least one passive optical retarder having its optic axis inclined with respect to the alignment directions of the first and second alignment layers, wherein the alignment directions of the first and second alignment layers and the optic axis of the optical at least one passive retarder are disposed, with respect to the polarization or absorption axis of the first linear polarizer, at angles a, b and c, where angle a is in the range of 2 to 25° inclusive; angle b is (x×a)°, where x is in the range of from 1 to 10, inclusive; and angle c is (2(b−a)+45)°.

15. A device as claimed in claim 14, wherein angle a is 6.9° and x=5.

16. A device as claimed in claim 14, wherein the passive optical retarder is disposed between the first linear polarizer and the liquid crystal layer.

17. A device as claimed in claim 14, wherein the liquid crystal layer is disposed between the first linear polarizer and the passive optical retarder.

18. A device as claimed in claim 1, further comprising at least one passive optical retarder having its optic axis inclined with respect to the alignment directions of the first and second alignment layers.

19. A device as claimed in claim 18, wherein the at least one passive optical retarder defines one of the first and second alignment layers.

20. A device as claimed in claim 18, wherein the at least one passive optical retarder is defined by a liquid crystal layer comprising liquid crystal molecules held in a fixed state.

21. A device as claimed in claim 20, wherein the liquid crystal molecules are confined by means of a polymer matrix.

22. A device as claimed in claim 18, further comprising a transparent divider in the liquid crystal layer which separates the first and second regions of the liquid crystal layer physically from one another.

23. A device as claimed in claim 22, wherein the transparent divider defines at least two passive optical retarders.

24. A device as claimed in claim 22, wherein at least one surface of the transparent divider provides a planar or homogeneous alignment.

25. A device as claimed in claim 22, wherein at least one surface of the transparent divider provides a homeotropic alignment.

26. A device as claimed in claim 22, wherein the alignment direction on at least one surface of the divider is inclined with respect to that of the respective alignment layer.

27. A device as claimed in claim 18, wherein the passive optical retarder is disposed between the first linear polarizer and the liquid crystal layer.

28. A device as claimed in claim 18, wherein the liquid crystal layer is disposed between the first linear polarizer and the passive optical retarder.

29. A device as claimed in claim 1, further comprising a transparent divider in the liquid crystal layer which separates the first and second regions of the liquid crystal layer physically from one another.

30. A device as claimed in claim 29, wherein at least one surface of the transparent divider provides a planar or homogeneous alignment.

31. A device as claimed in claim 29, wherein at least one surface of the transparent divider provides a homeotropic alignment.

32. A device as claimed in claim 29, wherein the alignment direction on at least one surface of the divider is inclined with respect to that of the respective alignment layer.

33. An assembly of at least two devices as claimed in claim 1.

34. An assembly as claimed in claim 33, wherein the at least two devices include: at least one first device in which liquid crystal molecules in the first and second regions have substantially equal pretilt angles; and a second device in which liquid crystal molecules in the first and second regions have unequal pretilt angles.

35. An assembly as claimed in claim 34, wherein the first device further includes at least one passive optical retarder having its optic axis inclined with respect to the alignment directions of the first and second alignment layers.

36. An assembly as claimed in claim 34, wherein the second device further includes at least one passive optical retarder having its optic axis inclined with respect to the alignment directions of the first and second alignment layers.

37. An assembly of at least one device as claimed in claim 1 in combination with another LCD device.

38. An assembly as claimed in claim 37, wherein said another LCD device includes a pi-cell, a Freedericksz-cell, a HAN-cell or a TN cell.

* * * * *